US006963426B2

(12) United States Patent
Odagiri et al.

(10) Patent No.: US 6,963,426 B2
(45) Date of Patent: Nov. 8, 2005

(54) COLOR TRANSFORMATION TABLE CREATING METHOD, A COLOR TRANSFORMATION TABLE CREATING APPARATUS, AND A COMPUTER READABLE RECORD MEDIUM IN WHICH A COLOR TRANSFORMATION TABLE CREATING PROGRAM IS RECORDED

(75) Inventors: Junichi Odagiri, Kawasaki (JP); Kimitaka Murashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 905 days.

(21) Appl. No.: 09/816,110

(22) Filed: Mar. 26, 2001

(65) Prior Publication Data

US 2002/0067493 A1 Jun. 6, 2002

(30) Foreign Application Priority Data

Sep. 28, 2000 (JP) ........................................ 2000-295976

(51) Int. Cl.[7] ............................ B41J 1/00; G06F 15/00
(52) U.S. Cl. ........................................................ 358/1.9
(58) Field of Search .......................... 358/1.9, 2.1, 504, 358/518–520, 523–525; 382/162

(56) References Cited

U.S. PATENT DOCUMENTS 5,471,324 A * 11/1995 Rolleston .................... 358/518

6,657,746 B1 * 12/2003 Fuchigami et al. ........... 358/1.9

FOREIGN PATENT DOCUMENTS

| JP | 6-46252 | 2/1994 |
| JP | 7-307872 | 11/1995 |
| WO | WO01/37544 | 11/1999 |
| WO | PCT/JP99/06447 | 11/1999 |

* cited by examiner

Primary Examiner—Kimberly Williams
Assistant Examiner—Charlotte M. Baker
(74) Attorney, Agent, or Firm—Staas & Halsey LLP

(57) ABSTRACT

A method for creating a color transformation table attaining accurate color transformation, by accurately obtaining a relationship between color signals in a simple way, without causing degradation of accuracy of the color transformation table and without much labor. The method comprises a dividing step of beforehand defining plural regions obtained by dividing the whole of a transformation target color space, and a color transformation table creating step of creating the color transformation table by using plural color transformation formulas corresponding to the respective color regions defined at the dividing step. The method is applied when a color transformation table correlating a color signal (for example, an RGB signal) outputted from a color input device such as an image scanner with a color signal (for example, an L*a*b* signal) in a color space differing from the color space of the color input device is created.

23 Claims, 14 Drawing Sheets

COLOR TRANSFORMATION TABLE CREATING METHOD, A COLOR TRANSFORMATION TABLE CREATING APPARATUS, AND A COMPUTER READABLE RECORD MEDIUM IN WHICH A COLOR TRANSFORMATION TABLE CREATING PROGRAM IS RECORDED

FIELD OF THE INVENTION

The present invention relates to a method and apparatus for creating a color transformation table according to which color signals (for example, RGB signals) outputted from a color input device such as an image scanner or the like are correlated with color signals (for example, L*a*b* signals) in a color space which are different from a color space of the color input device, and a computer readable record medium in which a color transformation table creating program is recorded.

DESCRIPTION OF THE RELATED ART

Generally, a color space is a coordinate system expressing colors. There are various color spaces. A Color printer (color output device), an image scanner (color input device), or the like has a color space (device-dependent color space) depending on the device such as CMY (Cyan, Magenta and Yellow) or RGB (Red, Green and Blue). A color printer whose color signal values are from 0 to 255 as the minimum value and the maximum value, for example, expresses output colors by color signal values of each of CMY in a range from 0 to 255.

Other than the device-dependent color space, L*a*b* or XYZ is used, which is a color space (device-independent color space) not depending on a device. A color space not depending on a device can express absolute colors, thus is used as an intermediate color space between device-dependent color spaces when color transformation is performed between color spaces of different devices. Here, color transformation signifies that signal values expressed in a certain color space are transformed into color signal values expressed in another color space.

For example, in order to match color appearance of a color original with color appearance of a printed matter of the color original obtained by reading it by a color scanner and outputting it from a color printer, color transformation is performed in the following procedures (1) and (2):

(1) Color-transforming an RGB image obtained by the image scanner into an image expressed in, for example, the L*a*b* system.

(2) Transforming the L*a*b* image obtained in (1) into CMY data for the color printer, and outputting an image by the color printer on the basis of the CMY data.

In color transformation according to the above procedures (1) and (2), color transformation tables (profiles) are used. In the color transformation table, relationships between different color spaces are registered. In color transformation, such the relationships are used. When a color registered in a color transformation table is transformed, the color transformation table is referred to read a relationship of the color registered therein, and color transformation is performed. When a color not registered in the color transformation table is transformed, an interpolating process is performed on the basis of data registered in the color transformation table to transform the desired color.

A color transformation table (profile) showing input characteristics of a color input device such as an image scanner or the like is a collection of about 5000 relationships between color signal values (RGB values) showing coordinates in the RGB color system and choromaticity coordinate values (L*a*b* values) in the L*a*b* color space, as will be described later with reference to, for example, Table 1.

When color transformation is performed using such a color transformation table, it is important to save labor of creating a color transformation table, and to create a color transformation table according to which accurate color transformation is possible.

The present invention is aimed to create a color transformation table showing input characteristics of a color input device such as an image scanner. Hereinafter, description will be made of creation of a color transformation table for an image scanner.

When a color transformation table is created, a standard color chart defined by ISO is read by an image scanner that is an object, then color signal values representing reflected light intensities of three primary color components are obtained from each color region in the color chart image.

Next, chromaticity coordinate values representing an absolute color in each color region in the above standard color chart are measured by, for example, a calorimeter, the chromaticity coordinate values are correlated with color signal values corresponding to the relevant color region, whereby a relationship that becomes a base of a color transformation table is obtained.

After that, an interpolating operation process is performed on the basis of the relationship that becomes the base, whereby a relationship between color signal values corresponding to each of grid points uniformly distributed in the RGB space and chromaticity coordinate values of the absolute color in the L*a*b* color space that should correspond to the color signal values is determined.

Namely, the measuring work as stated above is done on, for example, 288 colors expressed on the color patch chart, the interpolating operation process is performed on the basis of relationships of the 288 sets obtained through the measuring work, and relationships of 5000 sets are created.

As a technique relating to the above interpolating operation process, there is a technique disclosed in, for example, Japanese Patent Laid-Open Publication No. 7-307872. The publication cites "Shepard's Method" in which interpolation is performed with a weight inversely proportional to the fourth power of a distance, as a method for interpolation in a non-grid-shape color space. The method solves a problem of "scalloping" occuring in this method.

FIG. 18 shows a simplified example of "scalloping". As shown in FIG. 18, when vectors A, B, C, D and E are measured, a new vector F between the vectors A and B is obtained by averaging all the vectors A, B, C, D and E weighted in the Shepard's Method. As a result, the interpolated vector F differs from a vector indicated by a broken line estimated on the basis of the vectors A and B due to the contributions of the vectors C, D and E some distance away from the vector F. Such phenomenon is called "scalloping". Use of a color transformation table with narrow spaced grids is effective to appreciably avoid such "scalloping".

In the technique disclosed in the above publication, the number of relationships configuring the color transformation table is increased by liner interpolation, the increased relationships are registered to create a color transformation table with a larger number of relationships (with shorter spacing). The above technique can provide a color transformation table in which relationships larger in number than relationships actually measured, allowing labor saving in transformation table creation, preventing the effect of "scalloping", which results in accurate color transformation.

On the other hand, there has been proposed a technique for estimating spectral characteristics of a color scanner on the basis of relationships obtained as results of measurement, and obtaining relationships configuring a color transformation table using the obtained spectral characteristics. As a technique for estimating input characteristics of a color input device such as an image scanner, there is a technique disclosed in, for example, Japanese Patent Laid-Open Publication No. 6-46252. In the publication, there is proposed a technique for solving simultaneous equations derived on the basis of measured values in the least squares method to estimate the spectral characteristics.

However, a work to measure a number of color samples and a work to read a number of color samples by a color input device that is an object are essential even when a color transformation table is created by interpolating basic relationships (Japanese Patent Laid-Open Publication No. 7-307872), or when a color transformation table is created on the basis of spectral characteristics estimated from results of measurement (Japanese Patent Laid-Open Publication No. 6-46252).

Particularly, the technique disclosed in Japanese Patent Laid-Open Publication No. 7-307872 is effective to lighten a problem of "scalloping" by increasing the number of relationships by linear interpolation as stated above. However, the technique performs linear interpolation on original relationships, so that the number of relationships cannot be accurately increased if the number of relationships is originally small. In other words, it is essential to prepare a considerable number (several hundreds colors) of relationships that become a base in order to create a color transformation table attaining accurate color transformation. However, in order to prepare relationships that become the base of the color transformation table, it is essential to measure several hundreds of color signal values obtained by reading the original by a color input device and outputting it, and to measure several hundreds of color signal values in a color space which are different from a color space of the color input device, which is troublesome.

Alternatively, there has been proposed a technique (disclosed in PCT Application No. PCT/JP99/06447), in which image color signal values (RGB values) obtained by reading a color chart by a color input device can be correlated with three weights on principal component vectors of spectral reflectance, respectively, by using estimated spectral characteristics of a color input device, whereby spectral reflectance or common color signal values (L*a*b* values, XYZ values or the like) of the color chart are calculated from image color signal values. According to this technique, the spectral characteristics can be estimated even if the number of color patches (the number of color regions in the color chart) is only several tens. As a result, a color transformation table can be created with a small number of color patches, leading to labor saving in color transformation table creation.

However, spectral reflectance of color patches (color regions) on the color chart has various shapes. For this, if only one kind of weights are used as weights on three principal component vectors of the spectral reflectance, that is, if the same color transformation formula is used for the whole color space to determine the spectral reflectance as a linear sum of three principal component vectors, color transformation accuracy in a part of the regions might largely degrade. As a result, it is impossible to accurately express the spectral reflectance, leading to degradation of accuracy of the color transformation table.

SUMMARY OF THE INVENTION

In the light of the above problems, an object of the present invention is to provide a color transformation table creating method, a color transformation table creating apparatus and a computer readable record medium in which a color transformation table creating program is recorded, by which relationships of color signals are accurately obtained in a simplified way to create a color transformation table making accurate color transformation possible without much labor.

The present invention therefore provides a method for creating a color transformation table correlating a color signal outputted from a color input device in a color space of the color input device (hereinafter referred to as a transformation source color space) with a color signal in a color space (hereinafter referred to as a transformation target color space) which is different from the transformation source color space, comprising the steps of, a dividing step of beforehand defining a plurality of regions obtained by dividing the whole of the transformation target color space, and a color transformation table creating step of creating the color transformation table by using a plurality of color transformation formulas corresponding to the plural regions, respectively, defined at the dividing step.

The method may further comprise a reading step of reading a plurality of color regions on a color chart by the color input device, and outputting a color signal in the transformation target color space corresponding to each of the respective color regions from the color input device, a colorimetric step of measuring the plurality of color regions by a calorimeter, and outputting spectral reflectance corresponding to each of the color regions from the calorimeter, a classifying step of classifying the spectral reflectance according to which region among the plural regions in the transformation target color space a color signal in the transformation target color space corresponding to the spectral reflectance belongs to, and a spectral characteristics estimating step of estimating spectral characteristics of the color input device on the basis of the color signal outputted from the color input device at the reading step and the spectral reflectance outputted from the colorimeter at said colorimetric step, wherein, at the color transformation table creating step, the color transformation formula is created for each of the regions in the transformation target color space on the basis of the spectral reflectance classified at the classifying step and the spectral characteristics estimated at the spectral characteristics estimating step.

The color transformation table creating step may comprise a relationship creating step of creating a relationship between a color signal in the transformation source color space and a color signal in the transformation target color space by using the color transformation formula according to each region, for each of the color transform formulas, and a creation processing step of creating the color transformation table on the basis of the relationship created for each of the color transformation formulas at the relationship creating step.

The present invention further provides an apparatus for creating a color transformation table comprising a color transformation table creation unit for creating the color transformation table by using a plurality of color transformation formulas corresponding to a plurality of regions, respectively, the regions being obtained by dividing the transformation target color space.

The present still further provides a computer readable record medium in which a color transformation table creating program for making a computer realize a function of creating a color transformation table is recorded, the color transformation table creating program making the computer function as a color transformation table creation unit for creating the color transformation table by using a plurality of color transformation formulas corresponding to a plurality of regions, respectively, the regions being obtained by dividing the transformation target color space.

According to the color transformation table creating method, the color transformation table creating apparatus and the computer readable record medium in which the color transformation table creating program is recorded, relationships all over the color space can be accurately calculated, by using color transformation formulas (color transformation formulas differing from divided region to divided region) according to respective divided regions in the transformation target color space when a color transformation table for a color input device is created.

Accordingly, it is possible to create a color transformation table attaining accurate color transformation with a small number of color patch data without much labor. By using a color transformation table created as above, it is possible to improve color transformation accuracy all over the color space.

Principal component vectors to spectral reflectance calculated for each divided region have a high rate of contribution to the spectral reflectance existing in a corresponding divided region. Spectral reflectance obtain by measuring colors in plural kinds of color regions on the color chart is classified according to divided region, and a relationship is calculated by using a color transformation formulas corresponding to the divided region on the basis of the classified spectral reflectance and estimated spectral characteristics of the color input device. It is thereby possible to calculate a relationship more accurately than when principal component vectors to spectral reflectance calculated from the whole color space are used. According to this invention, principal component vectors are calculated from spectral reflectance of a color region (color patch) included in each divided region. Since spectral reflectance of two colors at a short distance from each other in a color space is similar, it becomes easy to express spectral reflectance with principal component vectors, thus a relationship can be calculated more accurately, as a result.

A plurality of relationships are created by using a plurality of color transformation formulas with respect to one color signal, and a color transformation table is created on the basis of the plural relationships. It is therefore possible to calculate a more accurate relationship, and create a color transformation table which attains more accurate color transformation. Using a color transformation table created as above, it is possible to further improve color transformation accuracy all over the color space.

The present invention provides the following functions and effects:

[1] As the transformation target color space, a uniform color space, in which a difference between colors when viewed by man and a distance between the colors in the color space are almost equal (CIELAB, CIELUV, CIECAM), is used, whereby a distance in the color space of any color can be used as a weighting factor.

[2] Since a plurality of regions obtained by dividing the transformation target color space have regions overlapping on each other, gradation of color transformation result is assured. Namely, a result of interpolation operation on plural color transformation results calculated by using color transformation formulas for respective divided regions are used as a color transformation result existing in the overlapped region, therefore gradation of a color in each region is assured.

[3] Use of plural regions obtained by dividing the whole transformation target color space according to hue angle makes accurate calculation of relationships possible. Namely, when principal component vectors are calculated on the basis of a spectral reflectance group obtained by classifying spectral reflectance of a color chart into hue angle regions, the principal component vectors have a high rate of contribution to the spectral reflectance group belonging to a corresponding hue angle region. Accordingly, such the principal component vectors can express a spectral reflectance group belonging to a corresponding hue angle region more accurately, thus a relationship can be accurately calculated, as a result. Such effect is remarkable when a color chart including colors having various hue angles is used.

[4] A hue angle of a primary color (for example, Cyan, Magenta, Yellow or the like) is the center of each region, whereby relationships can be calculated accurately. A shape of spectral reflectance of a color existing in the vicinity of the center of a primary color is similar to a shape of spectral reflectance of the primary color. For this, when principal component vectors are calculated on the basis of a spectral reflectance group existing in the vicinity of the center of a primary color, a rate of contribution of the principal component vectors to the spectral reflectance group in the vicinity of the center of the primary color is high, as a matter of course, thus a relationship can be calculated accurately.

[5] Use of plural regions obtained by dividing the whole transformation destination color space according to chroma makes accurate calculation of relationships possible. Namely, when principal component vectors are calculated on the basis of a spectral reflectance group obtained by classifying spectral reflectance of a color chart into chroma regions, a rate of contribution of the principal component vectors to the spectral reflectance group belonging to a corresponding chroma region is high, as a matter of course. Accordingly, such the principal component vectors can express the spectral reflectance group belonging to its chroma region more accurately, thus a relationship can be accurately calculated, as a result. Such effect is remarkable when a color chart including colors having various kinds of chroma is used.

[6] Use of plural regions obtained by dividing the whole transformation target color space according to lightness makes accurate calculation of relationships possible. Namely, when principal component vectors are calculated on the basis of a spectral reflectance group obtained by classifying spectral reflectance of a color chart into lightness regions, a rate of contribution of the principal component vectors to the spectral reflectance group belonging to a corresponding lightness region is high, as a matter of course. Accordingly, such the principal component vectors can express the spectral reflectance group belonging to its lightness region more accurately, thus a relationship can be accurately calculated, as a result. Such effect is remarkable when a color chart including colors having various kinds of lightness is used.

[7] When a color transformation result, into which one color signal in the transformation target color space is transformed through a color transformation formula, belongs to a region corresponding to the color transformation formula, the color transformation result is determined to be correct, and a color transformation table is created on the basis of the color transformation result determined to be correct. It is therefore possible to accurately calculate a relationship. Color transformation accuracy of a color transformation formula obtained from a corresponding divided region in a color space is low when a color signal outside region, to which the color transformation formula belongs, is color-transformed. For this, by discriminating a color transformation result having low accuracy from a color transformation result having high accuracy, it is possible to obtain a color transformation result having higher accuracy.

[8] When there are a plurality of color transformation results with respect to one color signal determined to be correct, a color transformation result with respect to the color signal is calculated on the basis of values relating to distances between the plural color transformation results determined to be correct and boundaries (boundary surfaces) of regions to which the respective color transformation results belong, therefore gradation of the color transformation is assured. There is a case where the plural color transformation results calculated by using respective color transformation formulas largely differ from one another and shift from the respective region boundary surfaces. In such case, gradation can be assured by performing a calculating process (interpolating process) on color transformation results as above.

[9] When there are a plurality of color transformation results with respect to one color signal determined to be correct, one of the plural color transformation results determined to be correct is selected as a color transformation result with respect to the color signal on the basis of values relating to distances between the plural color transformation results determined to be correct and boundaries (boundary surfaces) of regions to which the color transformation results belong. It is thereby possible to shorten the processing time required for relationship creation. When the number of divided regions is large, a time required for the calculating process (interpolating process) on color transformation results becomes long. In order to shorten the processing time, it is determined that one at the largest distance from the boundary surface among correct color transformation results has the highest reliability among the plural correct color transformation results, and that color transformation result is determined as a final color transformation result.

[10] When there is no color transformation result determined to be correct with respect to one color signal, a color transformation result with respect to the color signal is calculated on the basis of reciprocals of values relating to distances between the plural color transformation results obtained with respect to the color signal and boundaries (boundary surfaces) of regions to which the respective color transformation results belong. Even if all the color transformation results are incorrect, it is possible to calculate a color transformation result having higher reliability. Namely, when all the color transformation results are incorrect, one at the smallest distance from the boundary surface among the incorrect results is determined to have higher reliability.

[11] When there is no color transformation result determined to be correct with respect to one color signal, one of plural color transformation results obtained with respect to the color signal is selected as a color transformation result with respect to the color signal on the basis of reciprocals of values relating to distances between the plural color transformation results obtained with respect to the color signal and boundaries (boundary surfaces) of regions to which the respective color transformation results belong. Even if all the color transformation results are incorrect, it is possible to obtain a color transformation result having higher reliability within a short time.

[12] The color transformation table is used to correlate a color signal in the transformation source color space with spectral reflectance according to a color transformation result as a color signal in the transformation target color space. It is thereby possible to express a color transformation result by spectral reflectance, and substitute the color input device for a simplified calorimeter.

[13] When there are a plurality of color transformation results determined to be correct with respect to one color signal, one kind of spectral reflectance of the color signal is calculated on the basis of values relating to distances between the plural color transformation results determined to be correct and boundaries (boundary surfaces) of regions to which the respective color transformation results belong, whereby gradation of the spectral reflectance is assured.

[14] When there are a plurality of color transformation results determined to be correct with respect to one color signal, one kind of spectral reflectance according to the plural color transformation results determined to be correct is selected as spectral reflectance with respect to the color signal on the basis of values relating to distances between the plural color transformation results determined to be correct and boundaries (boundary surfaces) of regions to which the respective color transformation results belong. It is thereby possible to shorten a processing time required for relationship creation.

[15] When there is no color transformation result determined to be correct with respect to one color signal, spectral reflectance with respect to the color signal is calculated on the basis of reciprocals of values relating to distances between plural color transformation results obtained with respect to the color signal and boundaries (boundary surfaces) of regions to which the respective color transformation results belong. Even if all the color transformation results are incorrect, it is possible to calculate spectral reflectance having higher reliability.

[16] When there is no color transformation result determined to be correct with respect to one color signal, one kind of spectral reflectance according to plural color transformation results is selected as spectral reflectance with respect to the color signal on the basis of reciprocals of values relating to distances between the plural color transformation results obtained with respect to the color signal and boundaries (boundary surfaces) of regions to which the respective color transformation results belong. Even if all the color transformation results are incorrect, it is possible to obtain spectral reflectance having higher reliability within a short time.

[17] As values relating to distances between plural color transformation results and boundaries (boundary surfaces) of regions to which the respective color transformation results belong, values of $\Delta E94$ obtained by transforming the distances are used, whereby a color transformation table attaining more accurate color transformation when viewed by man is created. Since $\Delta E94$ has a color difference closer to man's view than a distance ($\Delta Eab$) in the $L*a*b*$ space, a color transformation result using $\Delta E94$ is more accurate when viewed by man.

DESCRIPTION OF THE PREFERRED EMBODIMENTS

Hereinafter, description will be made of an embodiment of the present invention.

[1] Description of a Structure of an Embodiment

Figure 1:
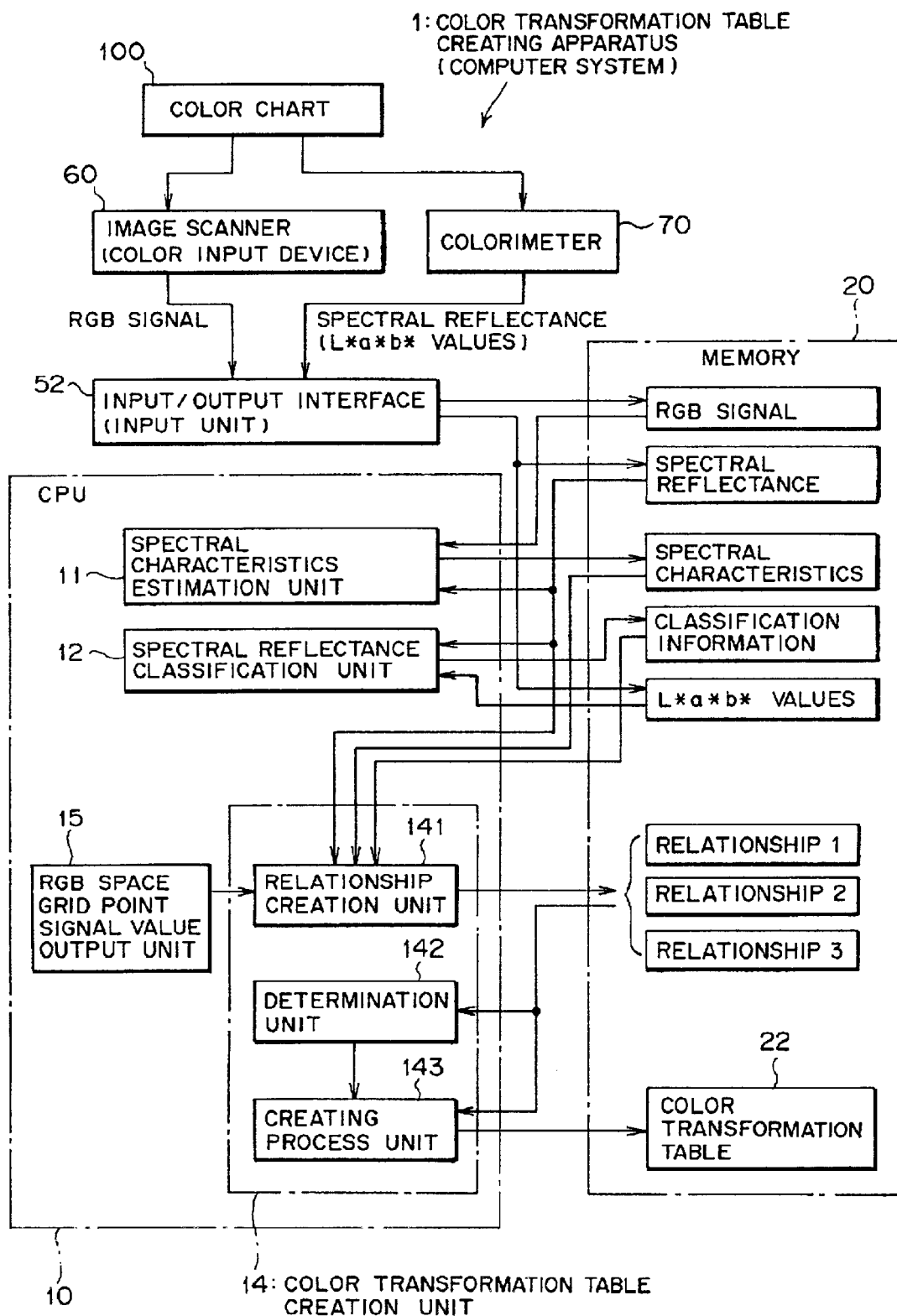
FIG. 1 is a block diagram showing a functional structure of a color transformation table creating apparatus according to an embodiment of this invention.
Figure 2:
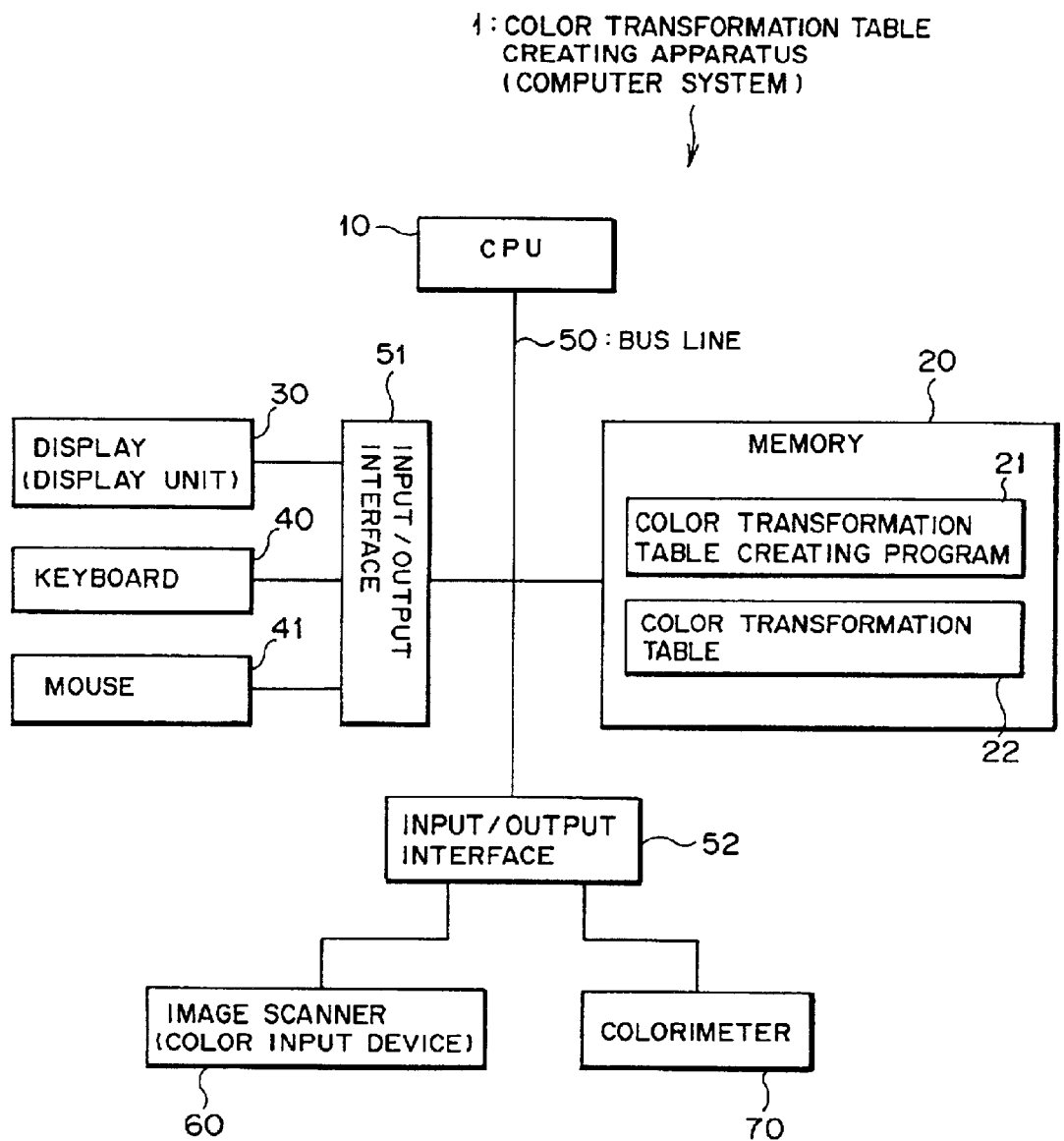
FIG. 2 is a block diagram showing a hardware structure of a computer system (color transformation table creating apparatus) for accomplishing a color transformation table creating method according to the embodiment of this invention.
Figure 3:
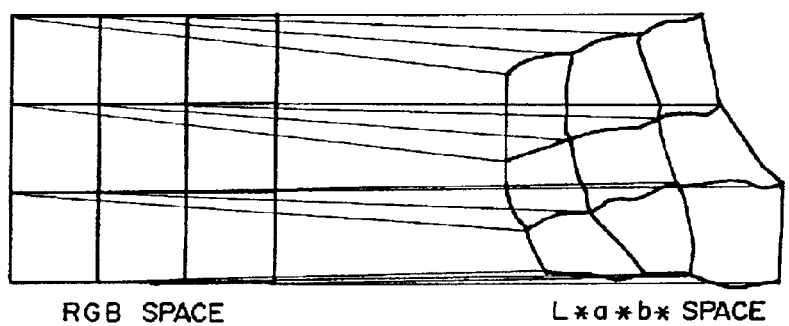
FIG. 3 is a diagram showing relationships between the RGB space and the L*a*b* space.
Figure 4A:
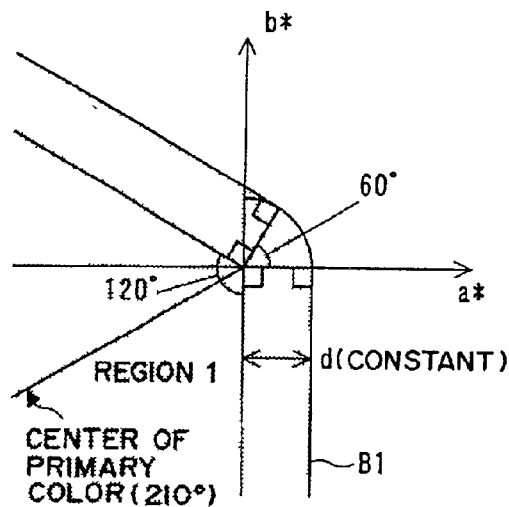
FIGS. 4A through 4C are diagrams for illustrating an example of region division according to hue angle according to the embodiment.
Figure 4B:
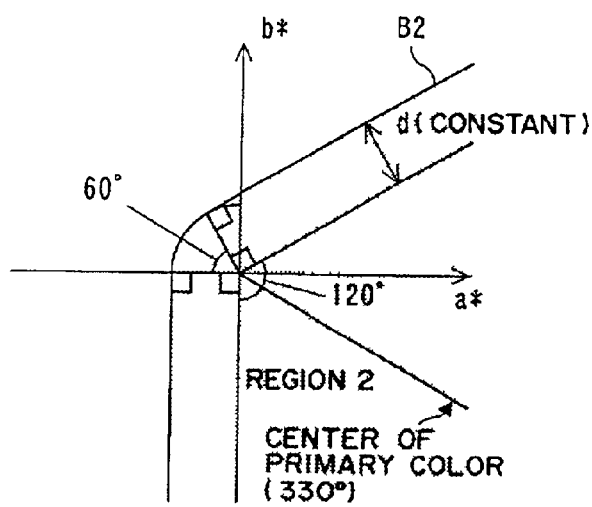
Figure 4C:
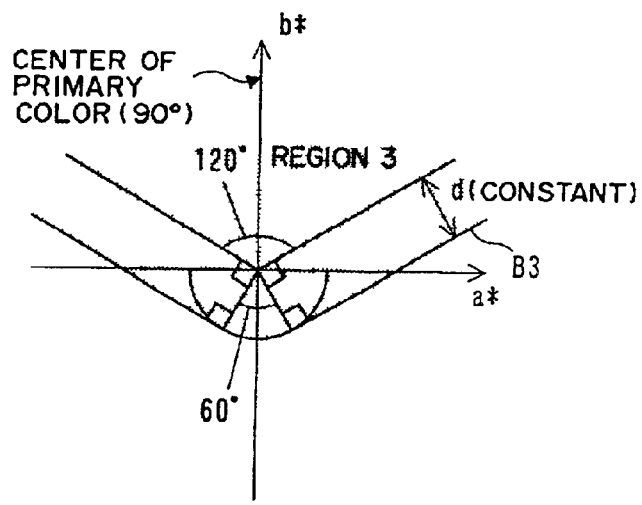

FIG. 1 is a block diagram showing a functional structure of a color transformation table creating apparatus according to an embodiment of this invention. FIG. 2 is a block diagram showing a hardware structure of a computer system (color transformation table creating apparatus) for accomplishing a color transformation table creating method according to the embodiment of this invention. FIG. 3 is a diagram showing relationships between the RGB space and the L*a*b* space. FIGS. 4A through 4C are diagrams (a*b* plane) for illustrating an example of region division according to hue angle according to the embodiment.

The computer system (personal computer: PC) 1 according to this embodiment shown in FIGS. 1 and 2 functions as an apparatus for creating a color transformation table representing relationships between a color space (transformation source color space: the RGB space in this embodiment) of an image scanner 60 as a color input device and a color space (transformation target color space: the L*a*b* space in this embodiment) independent of a device. By means of the color transformation table, it is possible to correlate RGB signals outputted from the image scanner with signals in the L*a*b* space.

The color transformation table for a color input device generally stores relationships in terms of about 5000 (to 30000) colors. In this embodiment, description will be made by way of creation of a grid-like color transformation table in the RGB space (RGB space having 17×17×17 grid points) having values in 17 levels in each of RGB colors, as shown in Table 1 below. Here, ranges of the L*a*b* values are $-100 \leq L^* \leq 100$, $-100 \leq a^* \leq 100$, and $-100 \leq b^* \leq 100$, for example.

TABLE 1

| RGB values | L*a*b*values |
|---|---|
| (0,0,0) | $(L^*_{(0,0,0)} \ a^*_{(0,0,0)} \ b^*_{(0,0,0)})$ |
| (0,0,15) | $(L^*_{(0,0,15)} \ a^*_{(0,0,15)} \ b^*_{(0,0,15)})$ |
| . | . |
| . | . |
| (255,255,255) | $(L^*_{(255,255,255)} \ a^*_{(255,255,255)} \ b^*_{(255,255,255)})$ |

The grid-like color transformation table in the RGB space represents relationships between signal values of colors (colors in grid points) distributed in grid arrangement in the RGB space and color signal values of the colors in the L*a*b* space, that is, relationships between RGB values obtained by reading a color original by the image scanner and outputting it, and L*a*b* colorimetric values of the color original. The color transformation table stores "grid-like RGB value data sets" in which values regularly increase as RGB values as shown in, for example, Table 1.

RGB values are distributed in grid arrangement in the RGB space, but the RGB space does not have a linear relationship with the L*a*b* space. For this, points in the L*a*b* space obtained by transforming RGB values into L*a*b* values do not distribute in grid arrangement, distribution of which is distorted. FIG. 3 conceptually shows relationships between the RGB space and the L*a*b* space in two dimensions.

This embodiment is described by way of example where the transformation target color space is a uniform color space (CIELAB, CIELUV, CIECAM or the like), in which a difference between colors viewed by man is almost equal to a distance between the colors in the color space, particularly, the L*a*b* space.

The L*a*b* space is a color space defined by CIE (Commission Internationale de l'Eclairage), in which a distance in the space represents a difference in color appearance that man senses. Namely, it is possible to use a distance in the L*a*b* space as a weighting factor for color transformation on any color in the L*a*b* space. To the contrary, in the CIE 1931 standard colorimetric system (xy chromaticity diagram) or the Munsell color system, a distance and a difference in color appearance do not correspond, thus a distance in the color space cannot be used as a weighting factor for color transformation. However, there are other coordinate systems such as the L*u*v* space or the CIECAM space other than the L*a*b* space, in which a distance and a difference in color appearance are equal, like the L*a*b* space. It is possible to use them.

As shown in FIG. 2, the computer system 1 is provided with a CPU 10 and a bus line 50 connected to the CPU 10. The bus line 50 is connected to a memory (ROM or RAM) 20, along with a display (for example, CRT, LCD, PDP or the like) 30, a keyboard 40 and a mouse 41 via an input/output interface 51.

A state of display on the display 30 is controlled by the CPU 10 to display various information for use in creation of a color transformation table. The keyboard 40 and the mouse 41 are operated by the operator (user) who refers to a screen of the display 30 to input various directions and various information to the CPU 10 (computer system 1).

The memory 20 stores an application program (color transformation table creating program) 21 for realizing a color transformation table creating apparatus, which comprises a spectral characteristics estimation unit 11, a spectral reflectance classification unit 12, a color transformation table creation unit 14 and an RGB space grid point signal value output unit 15 (shown in FIG. 1).

The CPU 10 reads the above application program 21 from the memory 20 to execute it, thereby accomplishing functions as the spectral characteristics estimation unit 11, the spectral reflectance classification unit 12, the color transformation table creation unit 14 and the RGB space grid point signal value output unit 15 (details of which will be described later), that is, a function of the color transformation table creating apparatus of this invention. As a result, a color transformation table creating method of this invention is executed.

The above application program 21 is recorded in a computer readable record medium such as a flexible disk, a CD-ROM or the like, and provided. The computer system 1 reads the program 21 from the record medium, transfers and stores it in an internal storage unit or an external storage unit to use the same. Alternatively, the program 21 may be recorded in a storage unit (record medium) such as a magnetic disk, an optical disk, a magneto-optic disk or the like, and provided to the computer system 1 from the storage unit through a communication path.

When the functions as the spectral characteristics estimation unit 11, the spectral reflectance classification unit 12, the color transformation table creation unit 14 and the RGB space grid point signal value output unit 15 are attained, the program 21 stored in the internal storage unit (memory 20 in this embodiment) is executed by a microprocessor (CPU 10 in this embodiment) of the computer. At this time, the computer system 1 may directly read the program recorded in a record medium to execute it.

In this embodiment, a computer is a concept including hardware and an operation system, signifying hardware operating under control of the operation system. When the operation system is unnecessary and the application program solely operates the hardware, the hardware itself corresponds to the computer. The hardware comprises at least a microprocessor such as a CPU or the like, and a means for reading the computer program recorded in a record medium.

The application program 21 includes program codes for realizing the functions as the spectral characteristics estimation unit 11, the spectral reflectance classification unit 12, the color transformation table creation unit 14 and the RGB space grid point signal value output unit 15 by such the computer (computer system 1). A part of the functions may be realized by an operation system, not by the application program 21.

As a record medium in this embodiment, any one of various computer readable record media such as an IC card, a ROM cartridge, a magnetic tape, a punched card, an internal storage unit (memory such as an RAM or an ROM) of the computer, an external storage unit, a printed matter on which codes such as bar codes are printed, and the like may be employed, other than the above flexible disk, CD-ROM, DVD, magnetic disk, optical disk and magneto-optic disk.

In the computer system 1 shown in FIGS. 1 and 2, an image scanner (color input device) 60 and a colorimeter 70 are connected to the bus line 50 via an input/output interface 52.

The computer system 1 of this embodiment creates a color transformation table for the image scanner 60 on the basis of results of reading of a color chart 100 (refer to FIG. 1) by the image scanner 60, and results of colorimetry of the color chart 100 by the calorimeter 70.

The input/output interface 52 functions as an input unit for inputting RGB signals corresponding to color regions obtained by reading several tens of color regions on the color chart 100 by the image scanner 60, and results of colorimetry (spectral reflectance and L*a*b* values to be described later) of the color regions by the calorimeter 70. The RGB signals and the results of colorimetry inputted through the input/output interface 52 are temporarily stored in the memory 20.

The calorimeter 70 is used to measure each color region on the color chart when a color transformation table for a color input device is created, which outputs spectral reflectance of 380–730 nm at resolution of 10 nm. The spectral reflectance outputted at this time is normalized with the maximum value of 1.0.

The calorimeter 70 of this embodiment has a function of transforming spectral reflectance into L*a*b* values and outputting the values, along with a function of measuring and outputting the spectral reflectance. The L*a*b* values are required when the CPU 10 (spectral reflectance classification unit 12) classifies the spectral reflectance, as will be described later.

According to this embodiment, L*a*b* values corresponding to spectral reflectance are obtained by the calorimeter 70. Alternatively, the CPU 10 (spectral reflectance classification unit 12) may transform spectral reflectance from the calorimeter 70, and calculate it.

The color chart 100 has at least several tens of color patches (color regions). As the color chart 100, an input color target (ANSI/IT8.7/2) by ANSI (American National Standards Institutes) standard may be used.

In such case, the input color target has a color patch region including 264 color patches, and a gray patch region (gray scale) including gray patches in different 24 gradation levels. In this embodiment, suitable several tens of color regions among these color regions are designated, and the designated color regions are read by the image scanner 60, or measured by the calorimeter 70.

The memory 20 also stores a color transformation table 22 created by the CPU 10, along with the above application program (color transformation table creating program) 21.

The memory 20 functions as a working memory when the color transformation table 22 is created, as will be described later with reference to FIG. 1. The memory 20 stores RGB signals from the image scanner 60, spectral reflectance (L*a*b* values) from the calorimeter 70, spectral characteristics, classification information, relationships 1 to 3, and the like.

Next, description will be made in more detail of various functions (functions as the spectral characteristics estimation unit 11, the spectral reflectance classification unit 12, the color transformation table creation unit 14 and the RGB space grid point signal value output unit 15) accomplished by the CPU 10.

The spectral characteristics estimation unit 11 reads out RGB signals and spectral reflectance of the same color chart 100 (the same color patch) obtained by the image scanner 60 and the calorimeter 70, respectively, from the memory 20, and estimates spectral characteristics of the image scanner 60 on the basis of the RGB values and the spectral reflectance. Estimation of the spectral characteristics is done in a method that will be described later with reference to Expressions (1) to (10).

The spectral reflectance classification unit 12 determines which region in the L*a*b* space L*a*b* values corresponding to each spectral reflectance obtained by the calorimeter 70 belong to, and classifies the spectral reflectance of several tens of color patches obtained by the calorimeter 70 into groups according to belonging region. Results of the classification are outputted as classification information to the memory 20, and stored therein.

According to this embodiment, three regions 1, 2 and 3 obtained by dividing the whole L*a*b* space are beforehand defined and set (dividing step). These three regions (hereinafter referred to divided regions, occasionally) 1 to 3 are obtained by dividing the L*a*b* space by boundaries (practically boundary surfaces in parallel to the L* axis) B1, B2 and B3 according to hue angle, as shown in FIGS. 4A through 4C, for example.

As shown in FIG. 4A, the region 1 is a region in a range at an angle of 120° centered at a hue angle of 210° of the primary color C (Cyan). As shown in FIG. 4B, the region 2 is a region in a range at an angle of 120° centered at a hue angle of 330° of the primary color M (Magenta). As shown in FIG. 4C, the region 3 is a region in a range at an angle of 120° centered at a hue angle of 90° of a primary color Y (Yellow).

A region having a width of d (constant) as shown in FIGS. 4A through 4C is added to and formed in each of the regions 1 to 3 in order to overlap the regions 1 to 3 on one another. By forming such a region, overlapped regions as shown in FIGS. 9 through 12, that is, a region formed by overlapping the regions 1 to 3 on one another, a region having a width of 2d formed by overlapping the regions 1 and 2 on each other, a region having a width of 2d formed by overlapping the regions 2 and 3 on each other, and a region having a width of 2d formed by overlapping the regions 3 and 1 on each other, are formed.

The color transformation table creation unit 14 forms the color transformation table 22 using color transformation formulas corresponding to the respective above-described three regions 1 to 3, which comprises a relationship creation unit 141, a determination unit 142 and a creating process unit 143. The RGB space grid point signal value output unit 15 generates signal values (grid point signal values) of colors distributed in grid arrangement in the RGB space as described above with reference to Table 1, and outputs the signal values to the color transformation table creation unit 14 (relationship creation unit 141).

The relationship creation unit 141 creates color transform formulas for respective regions in the L*a*b* space on the basis of spectral reflectance groups classified by the spectral reflectance classification unit 12 and spectral characteristics of the image scanner 60 estimated by the spectral characteristics estimation unit 12, and creates relationships between RGB values (color signals in the transformation source color space) from the RGB space grid point signal value output unit 15 and L*a*b* values (color signals in the transformation target color space),by using the three color transformation formulas.

Incidentally, the color transformation formulas are created in a method to be described later with reference to Expressions (11) to (16), accompanying creation of the relationship by the relationship creation unit 141. A color transformation formula used to transform RGB values into L*a*b* values is practically created by combining Expressions (14) to (16) with a formula used to transform XYZ values into L*a*b* values (not described since it is a known general formula).

At this time, the relationship creation unit 141 calculates three L*a*b* values of each of all grid points in the RGB space using three color transformation formulas to create three kinds of relationships, outputs the three kinds of relationships as relationships 1 to 3 to the memory 20, and stores them in the memory 20.

The determination unit 142 determines whether a result of color transformation (L*a*b* values) of RGB signals (signal values of one grid point) obtained by using a color transformation formula when the relationship creation unit 141 creates the relationships 1 to 3 belongs to a region corresponding to the color transformation formula. When the result belongs to the region, the determination unit 142 determines that the result of color transformation is correct.

In more detail, the determination unit 142 determines whether the relationship 1 [L*a*b*1 (L1, a1, b1) ] created by using a color transformation formula corresponding to the region 1 belongs to the region 1 shown in FIG. 4A. When the relationship 1 belongs to the region 1, the determination unit 142 determines that the relationship 1 is correct. Similarly, the determination unit 142 determines whether the relationship 2 [L*a*b*2 (L2, a2, b2)] created by using a color transformation formula corresponding to the region 2 belongs to the region 2 shown in FIG. 4B. When the relationship 2 belongs to the region 2, the determination unit 142 determines that the relationship 2 is correct. The determination unit 142 also determines whether the relationship 3 [L*a*b*3 (L3, a3, b3)] created by using a color transformation formula corresponding to the region 3 belongs to the region 3 shown in FIG. 4C. When the relationship 3 belongs to the region 3, the determination unit 142 determines that the relationship 3 is correct.

The creating process unit 143 obtains a set of relationships on the basis of three relationships 1 to 3 created using the three color transformation formulas by the relationship creation unit 141, and creates the color transformation table 22 in the memory 20. At this time, the creating process unit 143 creates the color transformation table 22 on the basis of results of color transformation (L*a*b* values) determined to be correct by the determination unit 142.

Figure 9:
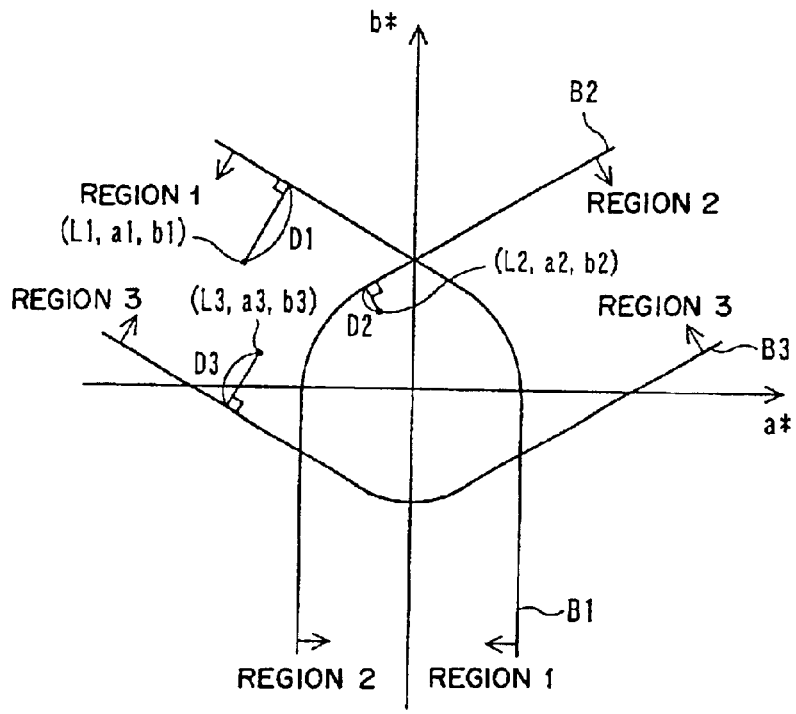
FIGS. 9 through 12 are diagrams for illustrating a practical example of the interpolating process according to the embodiment.
Figure 10:
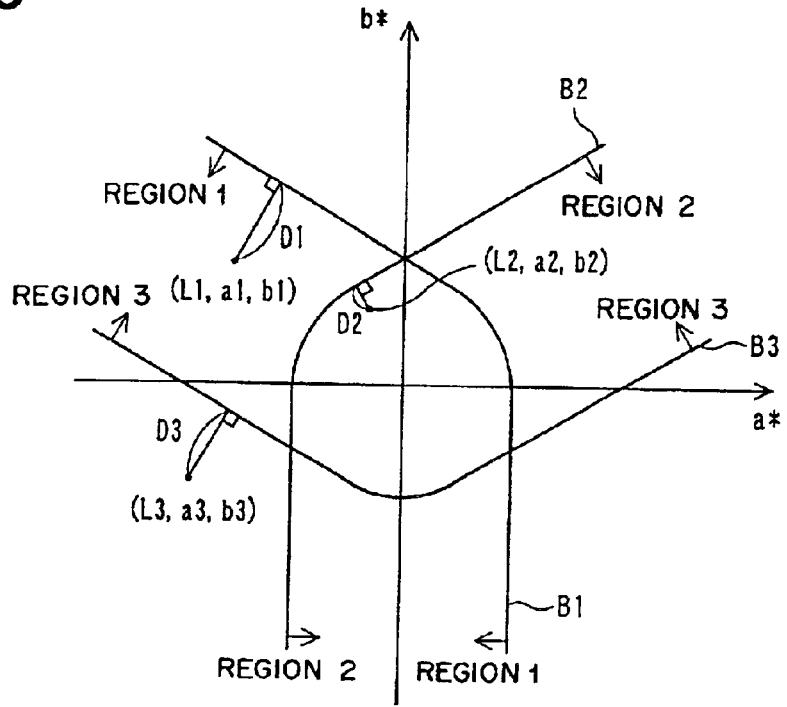

In more detail, when there are a plurality of results of color transformation determined to be correct by the determination unit 142 with respect to one grid point (one color signal) in the RGB space (when two or three results of color transformation are determined to be correct, in this embodiment), the creating process unit 143 calculates a result of color transformation (L*a*b* values) of one grid point on the basis of distances between the plural results of color transformation (L*a*b* values) determined to be correct and boundaries of regions to which the respective results of color transformation belong, and outputs the result, as will be described later with reference to FIGS. 9 and 10, and Expressions (17) and (18).

Figure 11:
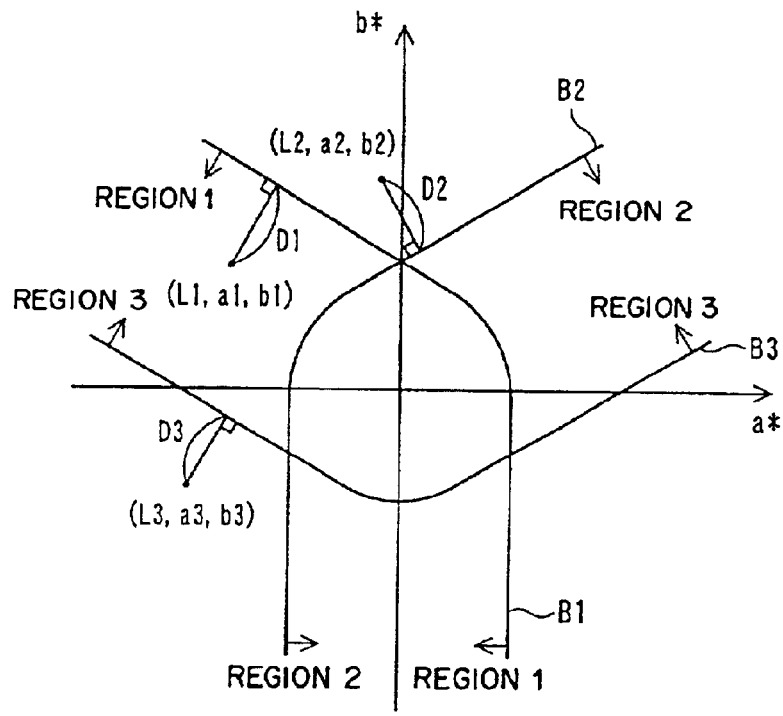

When there is one result of color transformation determined to be correct by the determination unit 142 with respect to one grid point in the RGB space, the creating process unit 143 outputs the result (L*a*b* values) of color transformation determined to be correct as it is as a result (L*a*b* values) of color transformation with respect to the grid point, as will be described later with reference to FIG. 11 and Expression (19).

Figure 12:
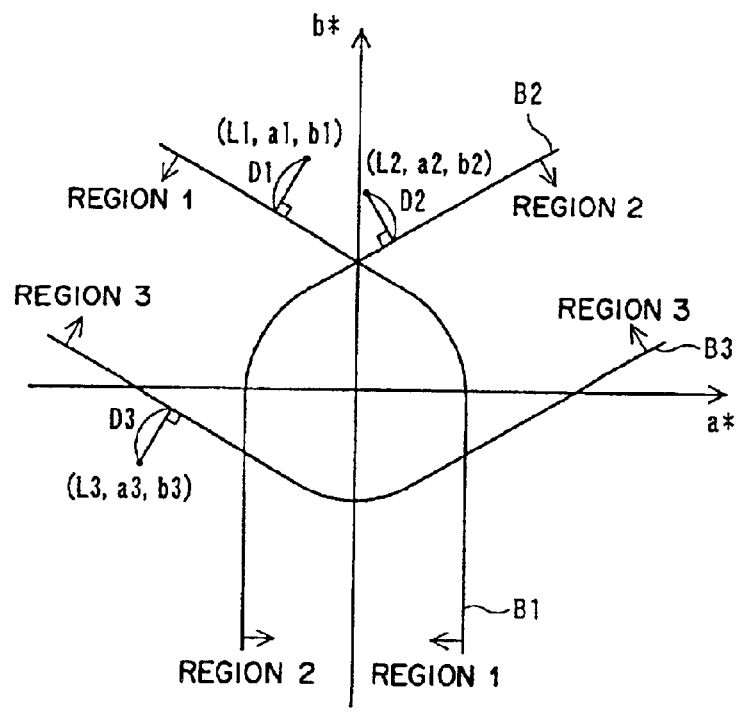

When there is no result of color transformation determined to be corrected by the determination unit with respect to one grid point in the RGB space, the creating process unit 143 calculates a result of color transformation with respect to the grid point on the basis of reciprocals of distances between three results of color transformation obtained with respect to the grid point by the relationship creation unit 141 and boundaries of regions to which the respective results of color transformation belong, and output it, as will be described later with reference to FIG. 12 and Expression (20).

When there are a plurality of results of color transformation determined to be correct by the determination unit 142 with respect to one grid point in the RGB space, the creating process unit 143 may function to select a result of color transformation having the highest reliability, and output it.

In such case, the determination unit 143 selects one of a plurality of results of color transformation determined to be correct as a result of color transformation with respect to one grid point on the basis of distances between the plural results of color transformation determined to be correct and boundaries of regions to which the respective results of color transformation belong, and outputs it. At this time, the creating process unit 143 selects, for example, a result of color transformation having the largest distance (a result of color transformation at the largest distance from the boundary).

Similarly, when there is no result of color transformation determined to be correct by the determination unit 142 with respect to one grid point in the RGB space, the creating process unit 143 may function to select a result of color transformation having the highest reliability, and output it.

In such case, the creating process unit 143 selects one of three results of color transformation as a result of color transformation with respect to the grid point on the basis of reciprocals of distances between the three results of color transformation obtained with respect to the grid point by the relationship creation unit 141 and boundaries of regions to which the respective results of color transformation belong, and outputs it. At this time, the creating process unit 143 selects a result of color transformation having the largest reciprocal of the distance (a result of color transformation at the shortest distance from the boundary), for example.

In the example shown in FIG. 1, the relationships 1 to 3 created by the relationship creation unit 141 are temporarily stored in the memory 20. Alternatively, the relationships 1 to 3 may be directly inputted to the determination unit 142 and the creating process unit 143 from the relationship creation unit 141.

[2] Description of Operations According to the Embodiment
[2-1] Description of Procedures for Creating a Color Transformation Table Next, description will be made of a flow of a color transformation table creating method (operations of the color transformation table creating apparatus 1 in the above structure) according to the embodiment of this invention, with reference to a flowchart (steps S11 to S25) shown in FIG. 5.

According to this embodiment, before creation of the color transformation table 22 is initiated, three regions 1, 2 and 3 obtained by dividing the whole L*a*b* space are beforehand defined and set (dividing step; not shown).

Figure 5:
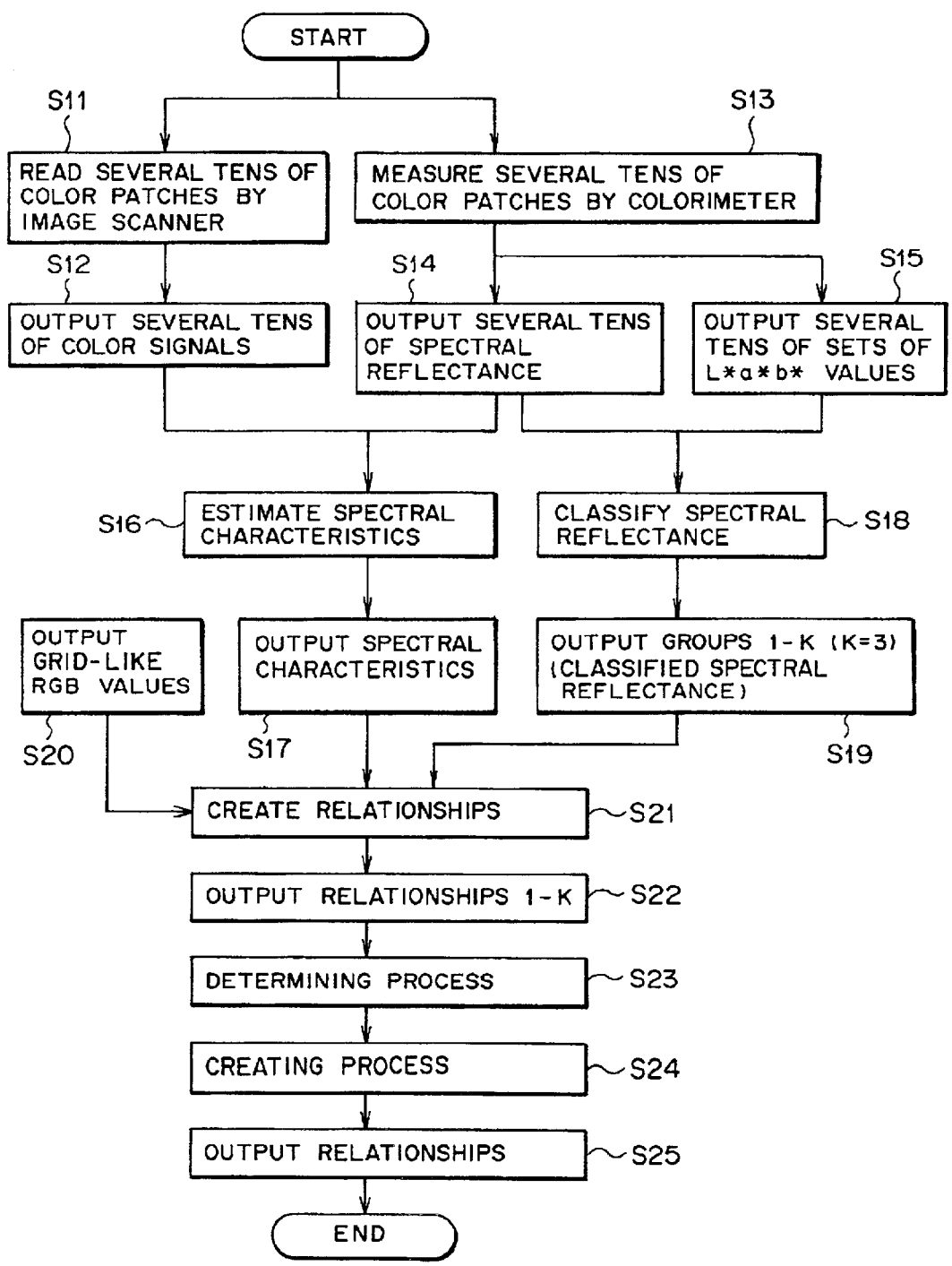
FIG. 5 is a flowchart for illustrating a flow of the color transformation table creating method according to the embodiment of this invention.

When the color transformation table creating apparatus 1 of this embodiment creates the color transformation table 22 for the image scanner 60, as shown in FIG. 5, several tens of color patches on the color chart 100 are read by the image scanner 60 (step S11; reading step), RGB signals corresponding to each of the color patches are outputted to the color transformation table creating apparatus 1 from the image scanner 60, and stored in the memory 20 through the input/output interface 52 (step S12; reading step).

The same several tens of color patches as those read by the image scanner 60 are measured by the colorimeter 70 (step S13; colorimetric step), spectral reflectance corresponding to each of the color patches is outputted from the calorimeter 70, and stored in the memory 20 through the input/output interface 52 (step S14; colorimetric step). At this time, the calorimeter 70 of this embodiment transforms the measured spectral reflectance into L*a*b* values corresponding to each of the color patches, and the L*a*b* values are stored in the memory 20 through the input/output interface 52 (step S15).

The spectral characteristics estimation unit 11 estimates spectral characteristics of the image scanner 60 on the basis of the RGB signals and the spectral reflectance of each of the color patches stored in the memory 20 according to procedures to be described later with reference to Expressions (1) to (10) (step S16; spectral characteristics estimating step). The spectral characteristics are outputted to the memory 20 and stored therein (step S17).

The spectral reflectance classification unit 12 determines which region 1, 2 or 3 shown in FIG. 4A, 4B or 4C the L*a*b* values of each of the color patches belong to. The spectral reflectance of each of the color patches is classified into a group 1, 2, . . . or K (K=3 in this embodiment) according to the region (step S18; classifying step). A result of the classification is stored as classification information in the memory 20 (step S19).

After that, the color transformation table creation unit 14 creates the color transformation table 22 while creating three color transformation formulas corresponding to the respective regions 1 to 3 in the L*a*b* space on the basis of the spectral reflectance groups (groups 1 to 3) classified by the spectral reflectance classification unit 11 and the spectral characteristics of the image scanner 60 estimated by the spectral characteristics estimation unit 12 (steps S21 to S25; color transformation table creating step).

At this time, the RGB space grid point signal value output unit 15 generates RGB values (grid point signal values) of each of colors distributed in grid arrangement in the RGB space, and outputs the RGB values to the color transformation table creation unit 14 (relationship creation unit 141) (step S20)

The relationship creation unit 141 creates relationships between the RGB values (grid point signal values) at step S21 and L*a*b* values by each of the color transformation formulas, by using the three color transformation formulas corresponding to the respective region 1 to 3 (step S21; relationship creating step).

At this time, as color transformation formulas used to transform the RGB values into the L*a*b* values, Expressions (14) to (16), which will be described later, and a formula used to transform XYZ values into L*a*b* values (known general formula) are employed. At step S21, L*a*b* values of each of the grid points in the RGB space are calculated by using the three color transformation formulas, and three kinds of relationships 1to 3 are created and outputted (step S22).

Next, the determination unit 142 determines whether each set of L*a*b* values (a result of color transformation) included in the relationship 1, 2 or 3 created at step S21 belong to the region corresponding to the color transformation formula, as stated above. When the L*a*b* values belong to the region, the determination unit 142 determines that the result of color transformation is correct, and outputs a result of the determination to the creating process unit 143 (step S23; determining step).

The creating process unit 143 determines a relationship on the basis of the relationships 1 to 3 created using the color transformation formulas at step S21, thereby creating the color transformation table 22 (steps S24 and S25). At this time, basically on the basis of L*a*b* values determined to be correct at step 24 among L*a*b* values included in the relationships 1 to 3 with respect to a grid point in the RGB space, final L*a*b* values of the grid point are determined (step S24; creating process step). The L*a*b* values determined as this are outputted as one establishing the relationship with respect to the grid point to the memory 20, whereby the color transformation table 22 is created in the memory 20 (step S25).

When two or three results of color transformation are determined to be correct, the creating process unit 143 calculates or selects a result of color transformation (L*a*b* values) of the grid point on the basis of distances between the two or three results of color transformation (L*a*b* values) determined to be correct and boundaries of regions to which the respective results of color transformation belong, and determines it.

When a result of color transformation determined to be correct is only one, the creating process unit 143 outputs the result of color transformation (L*a*b* values) determined to be correct as it is as a result of color transformation (L*a*b* values) of the grid point, as stated above.

To the contrary, when no result of color transformation determined to be correct exists, the creating process unit 143 calculates or selects a result of color transformation of the grid point on the basis of reciprocals of distances between three results of color transformation (L*a*b* values) obtained with respect to the grid point by the relationship creation unit 141 and boundaries of regions to which the respective results of color transformation belong, and determines it, as stated above.

[2-2] Description of Procedures for Spectral Characteristics Estimation

Figure 6:
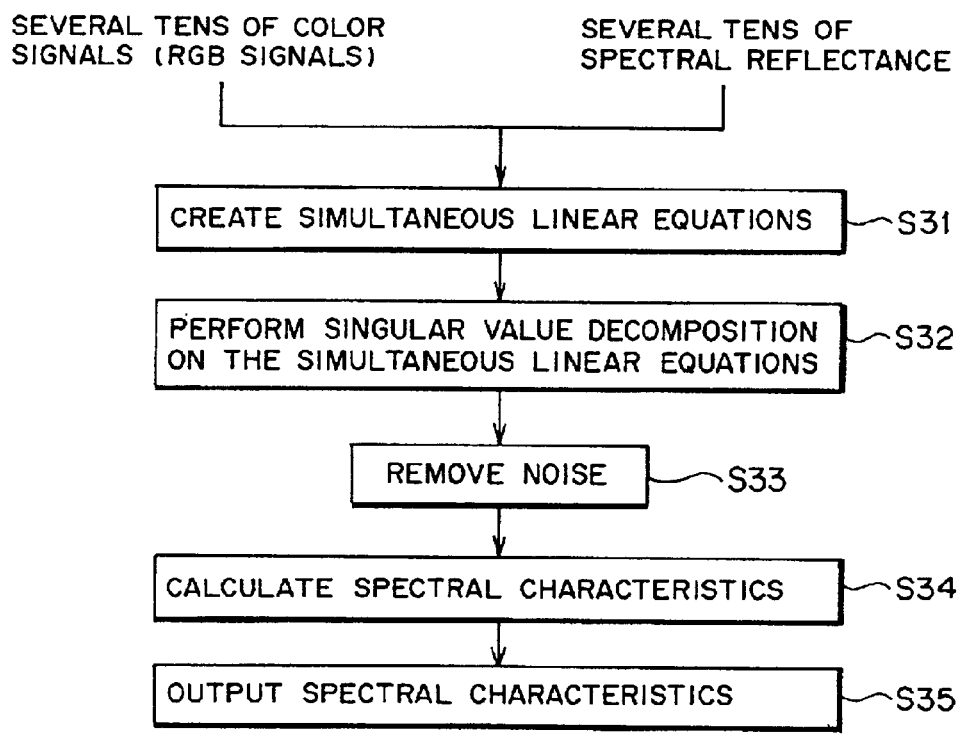
FIG. 6 is a flowchart for illustrating procedures for estimating spectral characteristics according to the embodiment.

Next, detailed description will be made of a process at step S16 in FIG. 5, that is, procedures for spectral characteristics estimation (operation of the spectral characteristics estimation unit 11) according to this embodiment, with reference to a flowchart (steps S31 to S35) shown in FIG. 6.

The spectral characteristics estimation unit 11 (step S16) estimates the spectral characteristics on the basis of several tens of color signals and several tens of kinds of spectral reflectance in the following procedures.

[2-2-1] Creation of Simultaneous Linear Formulas (Step S31)

Here, the spectral characteristics are treated as discrete data corresponding to wavelengths (380, 390, . . . , 730 nm) for every 10 nm in a visible radiation wavelength range 380–730 nm.

Generally, a value obtained by multiplying the spectral characteristics by spectral reflectance of a color patch is RGB values.

In order to estimate spectral characteristics of the image scanner 60, at step S31, simultaneous linear formulas for each of R, G and B comprising 36 or more equations with spectral characteristics being unknown are created as shown in Expression (1) below, using RGB values obtained by reading color patches by the image scanner 60 and spectral reflectance of the color patches obtained by the calorimeter 70.

$$\begin{pmatrix} R_1 & G_1 & B_1 \\ R_2 & G_2 & B_2 \\ \vdots & \vdots & \vdots \\ R_N & G_N & B_N \end{pmatrix} = \begin{pmatrix} REF_{(1,380)} & REF_{(1,390)} & \cdots & REF_{(1,730)} \\ REF_{(2,380)} & REF_{(2,390)} & \cdots & REF_{(2,730)} \\ \vdots & \vdots & \ddots & \vdots \\ REF_{(N,380)} & REF_{(N,390)} & \cdots & REF_{(N,730)} \end{pmatrix} \begin{pmatrix} LS_{R380} & LS_{G380} & LS_{B380} \\ LS_{R390} & LS_{G390} & LS_{B390} \\ \vdots & \vdots & \vdots \\ LS_{R730} & LS_{G730} & LS_{B730} \end{pmatrix} \quad (1)$$

In the above Expression (1), $R_i$, $G_i$ and $B_i$ (i=1, . . . , N) are values (RGB values) obtained by reading N color patches by the image scanner 60, $REF_{(i, j)}$ (i=1, . . . , N; j=380, 390, . . . , 730) is N sets of spectral reflectance data of the N color patches obtained by the calorimeter 70, and $REF_{(i, 380)}$, $REF_{(i, 390)}$, . . . , $REF_{(i, 730)}$ are obtained spectral reflectance (36 discrete data) of the i-th color patch. $LS_{Rj}$ (j=380, 390, . . . , 730) is spectral characteristics for R (36 discrete data), $LS_{Gj}$ (j=380, 390, . . . , 730) is spectral characteristics for G (36 discrete data), and $LS_{Bj}$ (j=380, 390, . . . , 730) is spectral characteristics for B (36 discrete data).

When the number of color patches N is less than 36, 36 simultaneous linear equations cannot be created. In such case, at step S31, simultaneous linear equations comprising 36 linear equations are created as shown by Expression (2) below.

$$36 \text{ rows} \left\{ \begin{pmatrix} R_1 & G_1 & B_1 \\ \vdots & \vdots & \vdots \\ R_N & G_N & B_N \\ 0 & 0 & 0 \\ \vdots & \vdots & \vdots \\ 0 & 0 & 0 \end{pmatrix} = \begin{pmatrix} REF_{(1,380)} & REF_{(1,390)} & \cdots & REF_{(1,730)} \\ \vdots & \vdots & & \vdots \\ REF_{(N,380)} & REF_{(N,390)} & \cdots & REF_{(N,730)} \\ 0 & 0 & \cdots & 0 \\ \vdots & \vdots & & \vdots \\ 0 & 0 & \cdots & 0 \end{pmatrix} \cdot \begin{pmatrix} LS_{R380} & LS_{G380} & LS_{B380} \\ LS_{R390} & LS_{G390} & LS_{B390} \\ \vdots & \vdots & \vdots \\ LS_{R730} & LS_{G730} & LS_{B730} \end{pmatrix} \right. \quad (2)$$

[2-2-2] Singular Value Decomposition of Simultaneous Linear Equations (Steps S32 and S33)

Here, a part of the above Expression (1) or (2) [that is, Expression (3) below] is called a spectral reflectance data set.

$$\begin{pmatrix} REF_{(1,380)} & REF_{(1,390)} & \cdots & REF_{(1,730)} \\ REF_{(2,380)} & REF_{(2,390)} & \cdots & REF_{(2,730)} \\ \vdots & \vdots & \ddots & \vdots \\ REF_{(N,380)} & REF_{(N,390)} & \cdots & REF_{(N,730)} \end{pmatrix} \quad (3)$$

At step S32, singular value decomposition is performed on the spectral reflectance data set. After that, at step S33, noise included in the spectral reflectance data is removed on the basis of a result of the singular value decomposition.

Noise removal is performed in the following procedures. First, singular value decomposition is performed on the spectral reflectance data set, so that the spectral reflectance data set shown in the above Expression (3) is decomposed into three metrics as shown by Expression (4) below.

$$\begin{pmatrix} REF_{(1,380)} & REF_{(1,390)} & \cdots & REF_{(1,730)} \\ REF_{(2,380)} & REF_{(2,390)} & \cdots & REF_{(2,730)} \\ \vdots & \vdots & \ddots & \vdots \\ REF_{(N,380)} & REF_{(N,390)} & \cdots & REF_{(N,730)} \end{pmatrix} = \quad (4)$$

$$\begin{pmatrix} U_{11} & \cdots & U_{1m} & \cdots & U_{1,36} \\ \vdots & \cdots & \vdots & \cdots & \vdots \\ U_{i1} & \cdots & U_{im} & \cdots & U_{i,36} \\ \vdots & \cdots & \vdots & \cdots & \vdots \\ U_{N1} & \cdots & U_{Nm} & \cdots & U_{N36} \end{pmatrix} \cdot \begin{pmatrix} W_1 & & & \\ & W_2 & & 0 \\ & & \ddots & \\ & 0 & & W_{36} \end{pmatrix} \cdot$$

$$\begin{pmatrix} P_{(1,380)} & P_{(1,390)} & \cdots & P_{(1,730)} \\ P_{(2,380)} & P_{(2,390)} & \cdots & P_{(2,730)} \\ \vdots & \vdots & \ddots & \vdots \\ P_{(36,380)} & P_{(36,390)} & \cdots & P_{(36,730)} \end{pmatrix}$$

In the above Expression (4), $REF_{(i,j)}$ (i=1, ... N, j=380, 390, ..., 730) is spectral reflectance data of N color patches obtained by the calorimeter 70, as stated above, and $W_m$ (m=1, ..., 36) is weights by which principal component vectors are to be multiplied. $P_{(m,j)}$ (m=1, ..., 36; j=380, 390, ..., 730) is 36 sets of principal component vectors for the spectral reflectance. Each set of principal component vectors is 36 discrete data. $U_{im}$ (i=1, ..., N; m=1, ..., 36) is coefficients.

Weights $W_1$–$W_{36}$ calculated in the singular value decomposition represent weights (degrees of importance) on the principal component vectors $P_{(1,j)}$–$P_{(36,j)}$ (j=380, 390, ..., 730). In proportion to each of the weights $W_1$–$W_{36}$, a degree of importance of the principal component vectors corresponding thereto increases.

Considering significant digits of the spectral reflectance data set, a weight at a distance of equal to or more than the significant digits from the largest weight can be assumed to be meaningless principal component vectors. At step S33, such principal component vectors are eliminated to remove noise included in the spectral reflectance data.

Namely, at step S33, a threshold value (normally called a condition number) is determined by using Expression (5) below, and ones equal to or less than the threshold value among the weights $W_1$–$W_{36}$ are replaced with "0" as shown in Expression (6) below to remove the noise.

Threshold value (condition number)=[a maximum value among the weights $W_1$–$W_{36}$]/[significant digits of the data set (calorimeter)]  (5)

Incidentally, Expression (6) below is used when there are M weights that exceed the above threshold value, wherein the M weights are $W_1$–$W_M$, and weights $W_{M+1}$–$W_{36}$ on the (M+1)th to 36th principal component vectors are replaced with "0". Where, M<36, as a matter of course.

$$\begin{pmatrix} U_{11} & \cdots & U_{1m} & \cdots & U_{1,36} \\ \vdots & \cdots & \vdots & \cdots & \vdots \\ U_{i1} & \cdots & U_{im} & \cdots & U_{i,36} \\ \vdots & \cdots & \vdots & \cdots & \vdots \\ U_{N1} & \cdots & U_{Nm} & \cdots & U_{N36} \end{pmatrix} \cdot \quad (6)$$

$$\begin{pmatrix} W_1 & & & \\ & \ddots & & 0 \\ & & W_M & \\ & 0 & & \ddots \\ & & & & 0 \end{pmatrix} \cdot \begin{pmatrix} P_{(1,380)} & P_{(1,390)} & \cdots & P_{(1,730)} \\ P_{(2,380)} & P_{(2,390)} & \cdots & P_{(2,730)} \\ \vdots & \vdots & \ddots & \vdots \\ P_{(36,380)} & P_{(36,390)} & \cdots & P_{(36,730)} \end{pmatrix}$$

[2-2-3] Calculation of Spectral Characteristics (Steps S34 and S35)

Here, the matrices shown in the above Expression (6) are replaced with matrices as shown by Expression (7) below, for the sake of simplicity.

$$(U) \cdot \begin{pmatrix} W_1 & & & \\ & \ddots & & 0 \\ & & W_M & \\ & 0 & & \ddots \\ & & & & 0 \end{pmatrix} \cdot (V) \quad (7)$$

Where, U is a N×36 matrix having the above coefficients $U_{im}$ (i=1, ..., N; m=1, ..., 36) as elements, and V is a 36×36 matrix having the principal component vectors $P_{(m,j)}$ (m=1, ..., 36; j=380, 390, ..., 730) as elements. The matrices U and V in the above Expression (7) have characteristics as shown in Expressions (8-1) and (8-2) below. Incidentally, in the Expressions (8-1) and (8-2), I is a unit matrix, $U^T$ is a transposed matrix of the matrix U, and $V^T$ is a transposed matrix of the matrix V.

$$(U) \cdot (U^T) = (I) \quad (8\text{-}1)$$

$$(V) \cdot (V^T) = (I) \quad (8\text{-}2)$$

The above Expression (1) or (2) is expanded as shown by Expression (9) below by using Expressions (8-1) and (8-2). By using Expression (10) below obtained from the expansion (9), spectral characteristics of the image scanner 60 is calculated (step S34), and the calculated spectral characteristics are outputted to the memory 20 and stored therein (step S35).

$$\begin{pmatrix} R_1 & G_1 & B_1 \\ R_2 & G_2 & B_2 \\ \vdots & \vdots & \vdots \\ R_N & G_N & B_N \end{pmatrix} = \quad (9)$$

$$(U) \cdot \begin{pmatrix} W_1 & & & \\ & \ddots & & 0 \\ & & W_M & \\ & 0 & & \ddots \\ & & & & 0 \end{pmatrix} \cdot (V) \cdot \begin{pmatrix} LS_{R380} & LS_{G380} & LS_{B380} \\ LS_{R390} & LS_{G390} & LS_{B390} \\ \vdots & \vdots & \vdots \\ LS_{R730} & LS_{G730} & LS_{B730} \end{pmatrix}$$

$$(V^T) \cdot \begin{pmatrix} 1/W_1 & & & \\ & \ddots & & 0 \\ & & 1/W_M & \\ & 0 & & \ddots \\ & & & & 0 \end{pmatrix} \cdot (U^T) \cdot \begin{pmatrix} R_1 & G_1 & B_1 \\ R_2 & G_2 & B_2 \\ \vdots & \vdots & \vdots \\ R_N & G_N & B_N \end{pmatrix} = \quad (10)$$

$$\begin{pmatrix} LS_{R380} & LS_{G380} & LS_{B380} \\ LS_{R390} & LS_{G390} & LS_{B390} \\ \vdots & \vdots & \vdots \\ LS_{R730} & LS_{G730} & LS_{B730} \end{pmatrix}$$

[2-3] Description of Procedures for Spectral Reflectance Classification

Next, description will be made of a process at step S18 in FIG. 5, that is, procedures for spectral reflectance classification (operation of the spectral reflectance classification unit 12) according to this embodiment, with reference to FIGS. 4A through 4C.

According to this embodiment, hue angles of the primary colors C, M and Y of the color chart 100 are set to 210°, 330° and 90°, and the CIELAB space (L*a*b* space) is beforehand divided into three regions 1 to 3 with the above hue angles 210°, 330° and 90° being the centers, respectively, as shown in FIGS. 4A through 4C. In order to form overlapped regions, a region having a width of d is added to and formed in each of the regions 1 to 3, as stated above. The width d is set to, for example, 5.0.

The spectral reflectance classification unit 12 (step S18) determines which region 1, 2 or 3 shown in FIG. 4A, 4B or 4C L*a*b* values of each color patch belong to. Whereby, spectral reflectance of each of color patches is classified into any one of three groups 1 to 3 according to region.

Namely, spectral reflectance whose L*a*b* values are determined to belong to the region 1 is classified into the group 1. Spectral reflectance whose L*a*b* values are determined to belong to the region 2 is classified into the group 2. Spectral reflectance whose L*a*b* values are determined to belong to the region 3 is classified into the group 3.

According to this embodiment, L*a*b* values used for determination when the regions are divided are obtained by the calorimeter 70. Alternatively, the spectral reflectance classification unit 12 may transform spectral reflectance from the calorimeter 70 into L*a*b* values corresponding to the spectral reflectance of each color patch.

[2-4] Descriptions of Procedures for Color Transform Formula Creation and Procedures for Relationship Creation Next, detailed description will be made of processes at steps S20 to S22 in FIG. 5, that is, procedures for color transform formula creation and procedures for relationship creation (operations of the relationship creation unit 141) according to this embodiment, with reference to a flowchart (steps S41 to S47) shown in FIG. 7.

The relationship creation unit 141 calculates L*a*b* values corresponding to grid-like RGB values.

Namely, the relationship 1 all over the color space is calculated on the basis of grid-like RGB values, the spectral characteristics of the image scanner 60, and the principal component vectors calculated from spectral reflectance of the group 1. Similarly, the relationship 2 all over the color space is calculated on the basis of grid-like RGB values, the spectral characteristics of the image scanner 60, and the principal component vectors calculated from spectral reflectance of the group 2. The relationship 3 all over the color space is calculated on the basis of grid-like RGB values, the spectral characteristics of the image scanner 60, and principal component vectors calculated from spectral reflectance of the group 3. Whereby, three sets of L*a*b* values (L*a*b*1, L*a*b*2 and L*a*b*3) are calculated as results of color transformation, by using three kinds of color transformation formulas for one set of grid-like RGB values.

The grid-like RGB values are outputted from the RGB space grid point signal value output unit 15. The spectral characteristics of the image scanner 60 are $LS_{Rj}$ (j=380, 390, . . . , 730), $LS_{Gj}$ (j=380, 390, . . . , 730) and $LS_{Bj}$ (j=380, 390, . . . , 730) estimated and calculated by using the above Expression (10) by the spectral characteristics estimation unit 11. The principal component vectors of each of the groups 1 to 3 are calculated as $P_{(m, j)}$ (m=1, . . . , M; j=380, 390, . . . , 730) using the above Expressions (4) to (6) by performing singular value decomposition on the spectral reflectance of each of the groups 1 to 3.

Hereinafter, description will be made of procedures for calculating a relationship of a certain group (spectral reflectance group) with reference to a flowchart (steps S41 to S47) shown in FIG. 7.

[2-4-1] Calculation of Weights by Which Principal Component Vectors are to be Multiplied (Steps S41 and S42)

Spectral reflectance is reproduced as a linear sum of M sets of principal component vectors calculated by performing singular value decomposing method on the spectral reflectance groups (groups 1, 2 and 3 in this embodiment), as shown Expression (11) below. Incidentally, Expression (11) is obtained by extracting elements in the i-th row in the above Expressions (4) and (6).

$$(REF_{(i, 380)}\ REF_{(i, 390)} \ldots REF_{(i, 730)}) = (U_{i1} \cdot W_1) \cdot (P_{(1, 380)}\ P_{(1, 390)} \ldots P_{(1, 730)}) + (U_{i2} \cdot W_2) \cdot (P_{(2, 380)}\ P_{(2, 390)} \ldots P_{(2, 730)}) + \ldots + (U_{iM} \cdot W_M) \cdot (P_{(M, 380)}\ P_{(M, 390)} \ldots P_{(M, 730)}) \quad (11)$$

Where, $REF_{(i, j)}$ (j=380, 390, . . . , 730) is the i-th spectral reflectance classified into each of the groups 1 to 3. Incidentally, i is 1, . . . , N, and N is the number of spectral reflectance $REF_{(i, j)}$ classified into each of the groups 1 to 3. $P_{(m, j)}$ (m=1, . . . , M; j=380, 390, . . . , 730) is M sets of principal component vectors. $U_{im} \cdot W_m$ (m=1, . . . , M) is weighting factors corresponding to the i-th spectral reflectance, by each of which the m-th principal component vectors ($P_{(m, 380)}, P_{(m, 390)}, \ldots, P_{(m, 730)}$) are to be multiplied.

As shown in the above Expression (11), it is possible to express spectral reflectance that is 36 dimensional data by a weighting factor in about several dimension (3–7 dimension; M=3–7), by using the principal component vectors.

RGB values (RGB) obtained by reading a certain color patch by the image scanner 60 and outputting it from the image scanner 60 are calculated on the basis of spectral characteristics $LS_{Rj}$ (j=380, 390, . . . , 730), $LS_{Gj}$ (j=380, 390, . . . , 730), $LS_{Bj}$ (j=380, 390, . . . , 730) and spectral reflectance $REF_j$ (j=380, 390, . . . , 730) obtained by measuring a color original of the color patch, as shown by Expression (12) below.

$$\begin{pmatrix} R \\ G \\ B \end{pmatrix} = \begin{pmatrix} LS_{R380} & LS_{R390} & \cdots & LS_{R730} \\ LS_{G380} & LS_{G390} & \cdots & LS_{G730} \\ LS_{B380} & LS_{B390} & \cdots & LS_{B730} \end{pmatrix} \cdot (REF_{380}\ REF_{390} \cdots REF_{730}) \quad (12)$$

The spectral reflectance $REF_j$ (j=380, 390, . . . , 730) is expressed as a linear combination of the M sets of principal component vectors as shown in the above Expression (11), Expression (12) thus can be rewritten into Expression (13) below.

$$\begin{pmatrix} R \\ G \\ B \end{pmatrix} = \underbrace{\begin{pmatrix} LS_{R380} & LS_{R390} & \cdots & LS_{R730} \\ LS_{G380} & LS_{G390} & \cdots & LS_{G730} \\ LS_{B380} & LS_{B390} & \cdots & LS_{B730} \end{pmatrix} \cdot \begin{pmatrix} P_{(1,380)} & P_{(2,380)} & \cdots & P_{(M,380)} \\ P_{(1,390)} & P_{(2,390)} & \cdots & P_{(M,390)} \\ \vdots & \vdots & \ddots & \vdots \\ P_{(1,730)} & P_{(2,730)} & \cdots & P_{(M,730)} \end{pmatrix}}_{A} \cdot \begin{pmatrix} U_1 \cdot W_1 \\ U_2 \cdot W_2 \\ \vdots \\ U_M \cdot W_M \end{pmatrix} \quad (13)$$

If inverse matrices of matrices indicated by A in the above Expression (13) can be calculated, weighting factors $U_{im} \cdot W_m$ (m=1, ..., M) are calculated from the RGB values as shown by Expression (14) below.

$$\begin{pmatrix} U_1 \cdot W_1 \\ U_2 \cdot W_2 \\ \vdots \\ U_M \cdot W_M \end{pmatrix} = \left[ \begin{pmatrix} LS_{R380} & LS_{R390} & \cdots & LS_{R730} \\ LS_{G380} & LS_{G390} & \cdots & LS_{G730} \\ LS_{B380} & LS_{B390} & \cdots & LS_{B730} \end{pmatrix} \cdot \begin{pmatrix} P_{(1,380)} & P_{(2,380)} & \cdots & P_{(M,380)} \\ P_{(1,390)} & P_{(2,390)} & \cdots & P_{(M,390)} \\ \vdots & \vdots & \ddots & \vdots \\ P_{(1,730)} & P_{(2,730)} & \cdots & P_{(M,730)} \end{pmatrix} \right]^{-1} \cdot \begin{pmatrix} R \\ G \\ B \end{pmatrix} \quad (14)$$

Hereinafter, this embodiment will be described by way of example where M=3 (that is, the number of principal component vectors is three). In this case, the matrices indicated by A become a 3×3 matrix. By substituting the RGB values (RGB) into the above Expression (14), weighting factors $U_1 \cdot W_1$, $U_2 \cdot W_2$ and $U_3 \cdot W_3$ corresponding to the RGB values are uniquely calculated.

According to this embodiment, singular value decomposition is performed on spectral reflectance of each of the groups 1 to 3, whereby three sets of principal component vectors of each of the groups 1 to 3 are calculated by using the above Expressions (4) to (6) (Step S41).

On the basis of the calculated principal component vectors $P_{(mj)}$ (m=1, 2, 3; j=380, 390, ..., 730) and spectral characteristics $LS_{Rj}$ (j=380, 390, ..., 730), $LS_{Gj}$ (j=380, 390, ..., 730) and $LS_{Bj}$ (j=380, 390, ..., 730), three kinds of Expressions (14) are created. By substituting RGB values from the RGB space grid point signal value output unit 15 in the Expression (14), weighting factors $U_1 \cdot W_1$, $U_2 \cdot W_2$ and $U_3 \cdot W_3$ by which the three sets of principal component vectors are to be multiplied are calculated (step S42).

[2-4-2] Calculation of Spectral Reflectance

Next, the three sets of principal component vectors $P_{(1, j)}$ (j=380, 390, ..., 730), $P_{(2, j)}$ (j=380, 390, ..., 730) and $P_{(3, j)}$ (j=380, 390, ..., 730) are multiplied by the weighting factors $U_1 \cdot W_1$, $U_2 \cdot W_2$ and $U_3 \cdot W_3$ obtained for each RGB values, respectively, by using the above Expression (14), and a linear sum thereof is determined. In consequence, spectral reflectance $RER_j$ (j=380, 390, ..., 730) corresponding to the RGB values is calculated as shown by Expression (15) below (step S43).

$(REF_{380}\ REF_{390}\ \ldots\ REF_{730}) = (U_1 \cdot W_1) \cdot (P_{(1,\ 380)}\ P_{(1,\ 390)}\ \ldots\ P_{(1,\ 730)}) + (U_2 \cdot W_2) \cdot (P_{(2,\ 380)}\ P_{(2,\ 390)}\ \ldots\ P_{(2,\ 730)}) + (U_3 \cdot W_3) \cdot (P_{(3,\ 380)}\ P_{(3,\ 390)}\ \ldots\ P_{(3,\ 730)})$ (15)

At this time, the spectral reflectance is corrected in such a way that when a value of the spectral reflectance $RER_j$ (j=380, 390, ..., 730) calculated using the above Expression (15) is less than 1.0 (that is, when the value is negative), the value is rewritten to 0.0, and when the value exceeds 1.0, the value is rewritten to 1.0. (step S44). Using the corrected spectral reflectance, XYZ values are calculated using Expression (16) below (step S45)

$$\begin{pmatrix} X \\ Y \\ Z \end{pmatrix} = \begin{pmatrix} L_{380} \cdot \bar{X}_{380} & L_{380} \cdot \bar{X}_{390} & \cdots & L_{380} \cdot \bar{X}_{730} \\ L_{380} \cdot \bar{Y}_{380} & L_{380} \cdot \bar{Y}_{390} & \cdots & L_{380} \cdot \bar{Y}_{730} \\ L_{380} \cdot \bar{Z}_{380} & L_{380} \cdot \bar{Z}_{390} & \cdots & L_{380} \cdot \bar{Z}_{730} \end{pmatrix} \cdot \quad (16)$$

$(REF_{380}\ REF_{390}\ \cdots\ REF_{730})$

Where $Lj \cdot \bar{X}j$ (j=380, ..., 730) is the product of color matching function X and light source, $Lj \cdot \bar{Y}j$ (j=380, ..., 730) is the product of color matching function Y and light source, and $Lj \cdot \bar{Z}j$ (j=380, ..., 730) is the product of color matching function Z and light source.

After the XYZ values are calculated from the RGB values as above, the XYZ values calculated by using the above Expression (16) are transformed into L*a*b* values by using the known transformation formula (step S46). A relationship between the RGB values and the L*a*b* values in grid arrangement is thus created.

The above relationship is created for each of the groups 1 to 3 that are spectral reflectance groups. As a result, three relationships 1 to 3 are created for each set of the RGB signal values (grid point signal values) as shown in, for example, Table 2 below, and outputted to and stored in the memory 20 (step S47).

According to this embodiment, the color transformation formula for transforming RGB values into L*a*b* values is a combination of the above Expressions (14) to (16) and the formula for transforming XYZ values into L*a*b* values, as stated above. The color transformation table creation unit 14 (relationship creation unit 141) creates the relationships 1 to 3 between RGB values and L*a*b* values, while creating the above color transformation formula for each of classified spectral reflectance groups, that is, for each divided region.

Figure 8:
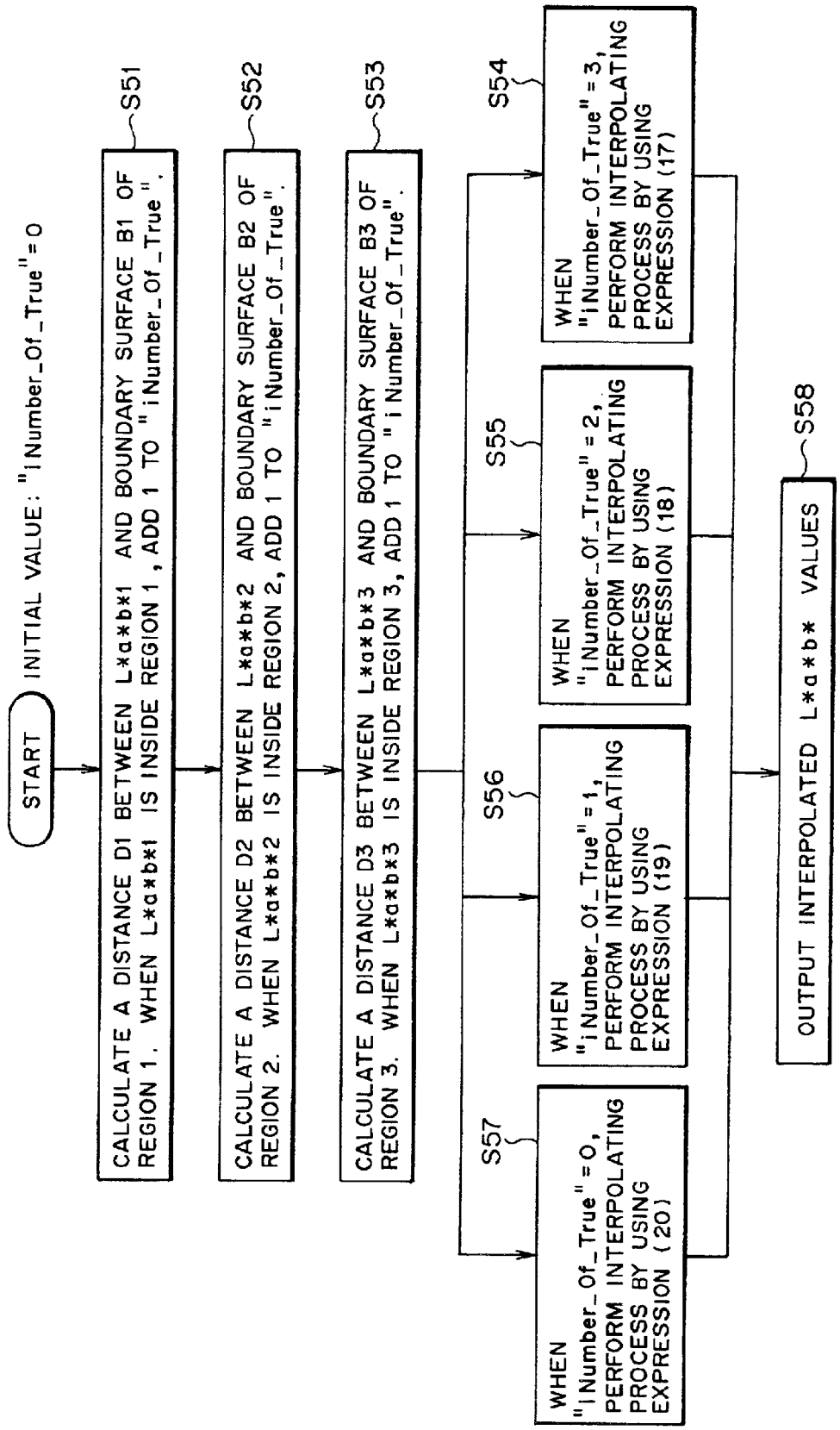
FIG. 8 is a flowchart for illustrating procedures for determination and procedures for an interpolating process according to the embodiment.

[2-5] Description of Procedures for Determination and Procedures for a Creating Process Next, processes at step S23 and S24 in FIG. 5, that is, procedures for determination and procedures for a creating process (operations of the determination unit 142 and the creation process unit 143) according to this embodiment will be described in detail with reference to FIGS. 9 through 12 and a flowchart (steps S51 to S58) shown in FIG. 8. FIGS. 9 through 12 are diagrams for illustrating a practical example of an interpolating process by the creation process unit 143.

The creation process unit 143 performs an interpolating operation process (interpolating process) on three sets of L*a*b* values created with respect to one set of RGB values by the relationship creation unit 141 to calculate one set of L*a*b* values, for example.

Prior to the calculating process (interpolating process), the determination unit 142 determines whether a result (L*a*b* values) of color transformation of an RGB signal obtained by the relationship creation unit 141 belongs to a corresponding region, according to this embodiment. When the result belongs to the corresponding region, it is determined that the result of color transformation is correct.

An example of three relationships 1 to 3 created by the relationship creation unit 141 and an example of results of determination by the determination unit 142 are shown in Table 2 below. In Table 2, "○" is entered in a column of determination result when the determination unit 142 determines that the result of color transformation (L*a*b* values) is correct, while "×" is entered in a column of determination result when the determination unit 142 determines that the result of color transformation (L*a*b* values) is incorrect.

calculates the distance D3 between L*a*b*3 (L3, a3, b3) and the boundary surface B3 of the region 3. When it is determined that L*a*b*3 (L3, a3, b3) is inside the region 3, that is, it is determined that L*a*b*3 (L3a3b3) is correct, the determination unit 142 adds 1 to "iNumber_Of_True" as a counter value (step S53).

The creation process unit 143 calculates and determines one color transformation result L*a*b*4 (L4, a4, b4) according to a value of the result of determination by the determination unit 142 (a value of "iNumber_Of_True), that is, the number of "○" in Table 2) using Interpolation Expressions (17) to (20) below (steps S54 to S58).

When three color transformation results L*a*b*1 (L1, a1, b1), L*a*b*2 (L2, a2, b2) and L*a*b*3 (L3, a3, b3) belong to the regions 1 to 3, respectively as shown in, for example, FIG. 9, and "iNumber_Of_Ture"=3 [refer to color transformation results of RGB values (0, 0, 0) in Table 2, for example], the creation process unit 143 calculates and determines one L*a*b*4 (L4, a4, b4) on the basis of the distances D1 to D3 by using interpolation formulas as shown by Expressions (17) below (step S54).

TABLE 2

| | relationship 1 | | relationship 2 | | relationship 3 | |
|---|---|---|---|---|---|---|
| RGB values | L*a*b*values | determination result | L*a*b*values | determination result | L*a*b*values | determination result |
| (0,0,0) | (L*$_{1(0,0,0)}$ a*$_{1(0,0,0)}$ b*$_{1(0,0,0)}$) | ○ | (L*$_{2(0,0,0)}$ a*$_{2(0,0,0)}$ b*$_{2(0,0,0)}$) | ○ | (L*$_{3(0,0,0)}$ a*$_{3(0,0,0)}$ b*$_{3(0,0,0)}$) | ○ |
| (0,0,15) | (L*$_{1(0,0,15)}$ a*$_{1(0,0,15)}$ b*$_{1(0,0,15)}$) | ○ | (L*$_{2(0,0,15)}$ a*$_{2(0,0,15)}$ b*$_{2(0,0,15)}$) | ○ | (L*$_{3(0,0,15)}$ a*$_{3(0,0,15)}$ b*$_{3(0,0,15)}$) | X |
| (0,0,31) | (L*$_{1(0,0,31)}$ a*$_{1(0,0,31)}$ b*$_{1(0,0,31)}$) | ○ | (L*$_{2(0,0,31)}$ a*$_{2(0,0,31)}$ b*$_{2(0,0,31)}$) | X | (L*$_{3(0,0,31)}$ a*$_{3(0,0,31)}$ b*$_{3(0,0,31)}$) | X |
| . | . | . | . | . | . | . |
| . | . | . | . | . | . | . |
| (255,255,255) | (L*$_{1(255,255,255)}$ a*$_{1(255,255,255)}$ b*$_{1(255,255,255)}$) | X | (L*$_{2(255,255,255)}$ a*$_{2(255,255,255)}$ b*$_{2(255,255,255)}$) | X | (L*$_{3(255,255,255)}$ a*$_{3(255,325,255)}$ b*$_{3(205,255,255)}$) | X |

As shown in FIGS. 9 through 12, for example, a result of color transformation of the relationship 1 is L*a*b*1 (L1, a1, b1), and a distance between L*a*b*1 (L1, a1, b1) and a boundary surface B1 of the region 1 is D1. Similarly, a result of color transformation of the relationship 2 is L*a*b*2 (L2, a2, b2), and a distance between L*a*b*2 (L2, a2, b2) and a boundary surface B2 of the region 2 is D2. A result of color transformation of the relationship 3 is L*a*b*3 (L3, a3, b3), and a distance between L*a*b*3 (L3, a3, b3) and a boundary surface B3 of the region 3 is D3.

At this time, the determination unit 142 calculates the distance D1 between L*a*b*1 (L1, a1, b1) and the boundary surface B1 of the region 1. The determination unit 142 adds 1 to "iNumber_Of_True" that is a counter value when it is determined that L*a*b*1 (L1, a1, b1) is inside the region 1, that is, it is determined that L*a*b*1 is correct (step S51).

Similarly, the determination unit 142 calculates the distance D2 between L*a*b*2 (L2, a2, b2) and the boundary surface B2 of the region 2. When it is determined that L*a*b*2 (L2, a2, b2) is inside the region 2, that is, it is determined that L*a*b*2 (L2, a2, b2) is correct, the determination unit 142 adds 1 to "iNumber_Of_True" as a counter value (step S52). The determination unit 142 further $$L4=(L1*D1+L2*D2+L3*D3)/(D1+D2+D3)$$

$$a4=(a1*D1+a2*D2+a3*D3)/(D1+D2+D3) \quad (17)$$

$$b4=(b1*D1+b2*D2+b3*D3)/(D1+D2+D3)$$

When two color transformation results L*a*b*1 (L1, a1, b1) and L*a*b*2 (L2, a2, b2) belong to the regions 1 and 2, respectively, as shown in, for example, FIG. 10, and "iNumber_Of_Ture"=2 [refer to color transformation result of RGB values (0, 0, 15) in Table 2, for example], one L*a*b*4 (L4, a4, b4) is calculated and determined on the basis of the distances D1 and D2 by using interpolation formulas as shown by Expressions (18) below.

$$L4=(L1*D1+L2*D2)/(D1+D2)$$

$$a4=(a1*D1+a2*D2)/(D1+D2) \quad (18)$$

$$b4=(b1*D1+b2*D2)/(D1+D2)$$

When only one color transformation result L*a*b*1 (L1, a1, b1) belongs to the region 1 as shown in, for example, FIG. 11, and "iNumber_Of_True"=1 [refer to color transformation results of RGB values (0, 0, 31) in Table 2, for example], L*a*b*1 (L1, a1, b1) is determined as it is as L*a*b*4 (L4, a4, b4) as shown by Expressions (19) below (step S56).

$$L4=L1$$
$$a4=a1 \quad (19)$$
$$b4=b1$$

When all three color transformation results L*a*b*1 (L1, a1, b1), L*a*b*2 (L2, a2, b2) and L*a*b*3 (L3, a3, b3) do not belong to the regions 1 to 3, respectively, as shown in, for example, FIG. 12, and "iNumber_Of_True"=0 [refer to color transformation results of RGB values (255, 255, 255) in Table 2, for example], one L*a*b*4 (L4, a4, b4) is calculated and determined on the basis reciprocals of the distances D1 to D3 by using interpolation formula shown by Expressions (20) below (step S57).

$$L4=(L1*(1/D1)+L2*(1/D2)+L3*(1/D3))/((1/D1)+(1/D2)+(1/D3))$$
$$a4=(a1*(1/D1)+a2*(1/D2)+a3*(1/D3))/((1/D1)+(1/D2)+(1/D3)$$
$$b4=(b1*(1/D1)+b2*(1/D2)+b3*(1/D3))/((1/D1)+(1/D2)+(1/D3)) \quad (20)$$

L*a*b* values (L*a*b*4 (L4, a4, b4)) after the interpolating process obtained in any one of the processes at steps S54 to S57 are outputted as a final result of color transformation corresponding to one set of RGB values to the memory 20, and a relationship of the RGB values is determined.

The above processes are carried out on all grid-like RGB values (grid point signal values), whereby the color transformation table 22 for the image scanner 60 is created in the memory 20.

When there are a plurality of color transformation results that are determined to be correct, the above creation process unit 143 calculates and determines one L*a*b*4 (L4, a4, b4) on the basis of the distances D1 to D3 as shown in the Expressions (17) or (18). Alternatively, the creation process unit 143 may determine that a color transformation result having the largest distance (color transformation result at the largest distance from the boundary) has the highest reliability, and select and determine it as L*a*b*4 (L4, a4, b4).

In the example shown in FIG. 9, L*a*b*1 (L1, a1, b1) is selected and determined as a final color transformation result L*a*b*4 (L4, a4, b4) in the selecting process since D1>D3>D2. In the example shown in FIG. 10, L*a*b*1 (L1, a1, b1) is selected and determined as a final color transformation result since D1>D2.

Similarly, when there is no color transformation result that is determined to be correct, the creating process unit 143 calculates and determines one L*a*b*4 (L4, a4, b4) on the basis of reciprocals of the distances D1 to D3 as shown in Expressions (20). Alternatively, the creating process unit 143 may determine that a color transformation result having the largest reciprocal of the distance (that is, color transformation result having the shortest distance and closest to the boundary) has the highest reliability, and select and determine it.

In the example shown in FIG. 12, L*a*b*3 (L3, a3, b3) is selected and determined as a final color transformation result L*a*b*4 (L4, a4, b4) in the selecting process since D3<D1<D2.

[3] Description of Functions and Effects of the Embodiment

According to this embodiment, it is possible to accurately calculate relationships all over the color space by using color transformation formulas according to respective divided regions of the L*a*b* space (that is, color transformation formulas differing from divided region to divided region) when the color transformation table 22 for the image scanner 60 is created.

The relationship creation unit 141 of this embodiment calculates principal component vectors for each divided region on the basis of a spectral reflectance group of color patches belonging to each divided region beforehand set. Two colors at a short distance from each other in the color space have similar spectral reflectance. For this, principal component vectors calculated on the basis of a spectral reflectance group belonging to the same region has a high rate of contribution to spectral reflectance existing in each divided region. Use of such principal component vectors are useful to express spectral reflectance, which in turn allows a relationship to be calculated highly accurately, as a result. Namely, Use of not principal component vectors calculated from the whole space but principal component vectors calculated from each divided region allows calculation of more accurate relationships.

Accordingly, it is possible to create the color transformation table 22 attaining accurate color transformation with a small number of color patches (color chart data: image color signals, spectral reflectance) without much labor. Use of the color transformation table 22 created as this can improve accuracy of color transformation all over the color space.

The color transformation table creation unit 14 creates three relationships 1 to 3 with respect to one RGB signal (grid-like signal values) by using three color transformation formulas, and creates the color transformation table 22 on the basis of these relationships 1 to 3. It is therefore possible to calculate a relationship having higher accuracy in consideration of the relationships. As a result, it is possible to create the color transformation table 22 attaining accurate color transformation, and improve the color transformation accuracy all over the color space by using the color transformation table 22 created as this.

This embodiment provides the following effects.

According to this embodiment, by using the L*a*b* space (CIELAB) as the transformation target color space, which is a uniform color space in which a difference between colors viewed by man and a distance between the colors in the color space are approximately equal, it is possible to use a distance in the color space of any color in the color space as a weighting factor when color transformation is performed.

The three divided regions 1 to 3 obtained by dividing the L*a*b* space have regions overlapping on each other, whereby gradation of a color transformation result is assured. Namely, results of the interpolation operation on a plurality of color transformation results calculated through the color transformation equations for respective divided regions are used as a color transformation result L*a*b*4 (L4, a4, b4) existing in the overlapped region, gradation of colors in the divided regions 1 to 3 is assured.

Use of the regions 1 to 3 obtained by dividing the L*a*b* space according to hue angle allows accurate calculation of relationships. Namely, when principal component vectors are calculated on the basis of a spectral reflectance group obtained by classifying spectral reflectance of a color chart into hue angle regions, the principal component vectors have, of course, a high rate of contribution to the spectral reflectance group belong to the corresponding hue angle region 1, 2, or 3. Therefore, such principal component vectors can express more accurately a spectral reflectance group belonging to each of the hue angle groups 1 to 3, so that relationships can be calculated accurately as a result.

Such effect is remarkably when a color patch including colors having various hue angles.

Particularly, the L*a*b* space is divided into three regions 1 to 3 with hue angles of the primary colors (Cyan, Magenta and Yellow) being the centers of the respective regions. A shape of spectral reflectance existing in the vicinity of the center of a primary color is similar to the shape of spectral reflectance of the primary color. Accordingly, when principal component vectors are calculated on the basis of a spectral reflectance group existing in the vicinity of the center of a primary color, the principal component vectors have, of course, a high rate of contribution to the spectral reflectance group in the vicinity of the primary color, so that relationships can be accurately calculated.

When a color transformation result (L*a*b* values) obtained by transforming one set of RGB values (grid point signal values) through a color transformation formula belongs to a region corresponding to the color transformation formula, it is determined that the color transformation result is correct. The color transformation table 22 is created on the basis of the color transformation result determined to be correct, so that relationships can be more accurately calculated. Accuracy of color transformation of a color transformation formula obtained from a certain divided region of the color space is low when a color signal outside its own region is transformed, as a matter of course. Accordingly, by discriminating a color transformation result having low accuracy from a color transformation result having high accuracy, it is possible to obtain a color transformation result having higher accuracy.

Where there are a plurality of color transformation results (L*a*b* values) determined to be correct with respect to one set of RGB signals (grid point signal values), a color transformation result L*a*b*4 (L4, a4, b4) with respect to the RGB signals is calculated on the basis of distances D1 to D3 between the plurality (two or three) of color transformation results determined to be correct and boundaries of regions to which the respective color transformation results belong, so that gradation of the color transformation is assured. There is a case where plural color transformation results calculated by using respective color transformation formulas largely differ and they are shifted from respective region boundary surfaces. In such case, a calculating process (interpolating process) as above is performed on such the color transformation results, so that gradation is assured.

When there are a plurality of color transformation results (L*a*b* values) determined to be correct with respect to one RGB signal (grid point signal values), one of the plural color transformation results determined to be correct is selected as a color transformation result L*a*b*4 (L4, a4, b4) with respect to the RGB signal on the basis of the above distances D1 to D3, so that a processing time required to create a relationship is shortened.

When the number of divided regions is large, a time required for the process for calculating color transformation results in the creation process unit 143 increases in proportion thereto. In order to shorten the processing time, one at the largest distance from the boundary surface among the correct color transformation results is determined to have the highest reliability among the plural correct color transformation results, and that color transformation result is determined as a final color transformation result L*a*b*4 (L4, a4, b4).

When there is no color transformation result (L*a*b* values) determined to be correct with respect to one RGB signal (grid point signal values), a color transformation result L*a*b*4 (L4, a4, b4) with respect to the RGB signal is calculated on the basis of reciprocals of the distances D1 to D2 between the color transformation results obtained with respect to the RGB signal and the boundaries (boundary surfaces) to which the respective color transformation results belong. Even if all the color transformation results are incorrect, it is possible to calculate a color transformation result L*a*b*4 (L4, a4, b4) having higher reliability. Namely, when all the color transformation results are incorrect, one at the shortest distance from its boundary surface B1, B2 or B3 among the incorrect color transformation results is determined to have higher reliability.

When there is no color transformation result (L*a*b* values) determined to be correct with respect to one RGB signal (grid-like signal values), one among color transformation results is selected as a color transformation result L*a*b*4 (L4, a4, b4) with respect to the RGB signal on the basis of reciprocals of the distances D1 to D3. Even if all the color transformation results are incorrect, it is possible to obtain a color transformation result L*a*b*4 (L4, a4, b4) having higher reliability within a short time. In such case, a color transformation result closest to the boundary surface is determined to have the highest reliability, and a color transformation result having the largest reciprocal of the distance is selected, as stated above.

[4] Description of Modifications of the Embodiment

Next, description will be made of modifications of the embodiment with reference to FIGS. 13 through 17.

[4-1] Description of a First Modification

Figure 13:
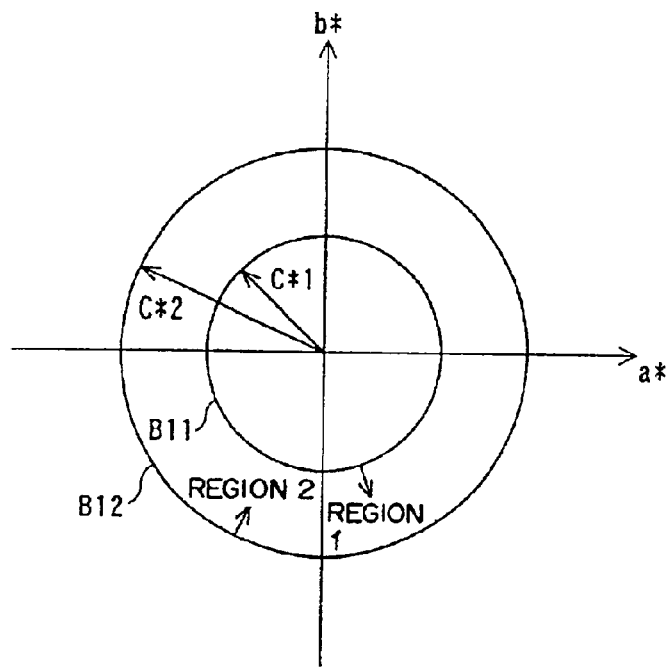
FIG. 13 is a diagram for illustrating an example of region division according to chroma according to a first modification of the embodiment.
Figure 14:
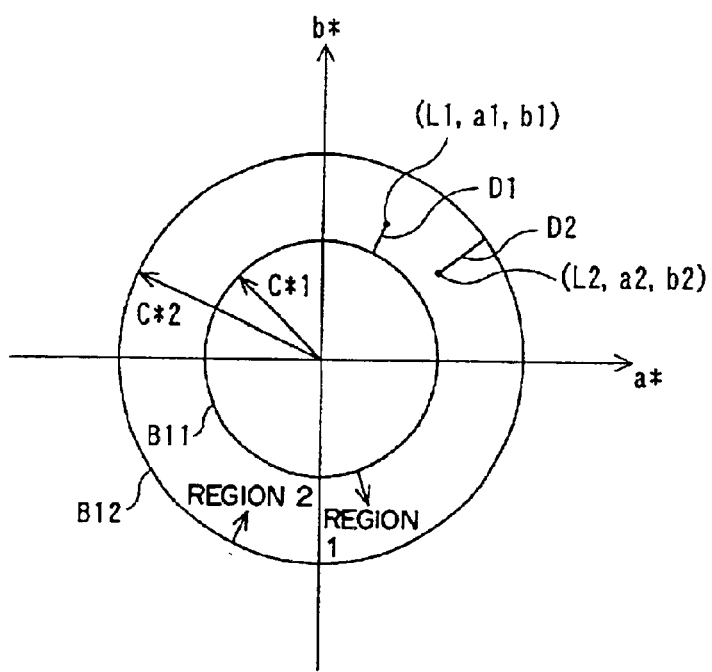
FIGS. 14 through 16 are diagrams for illustrating a practical example of the interpolating process according to the first modification of the embodiment.
Figure 15:
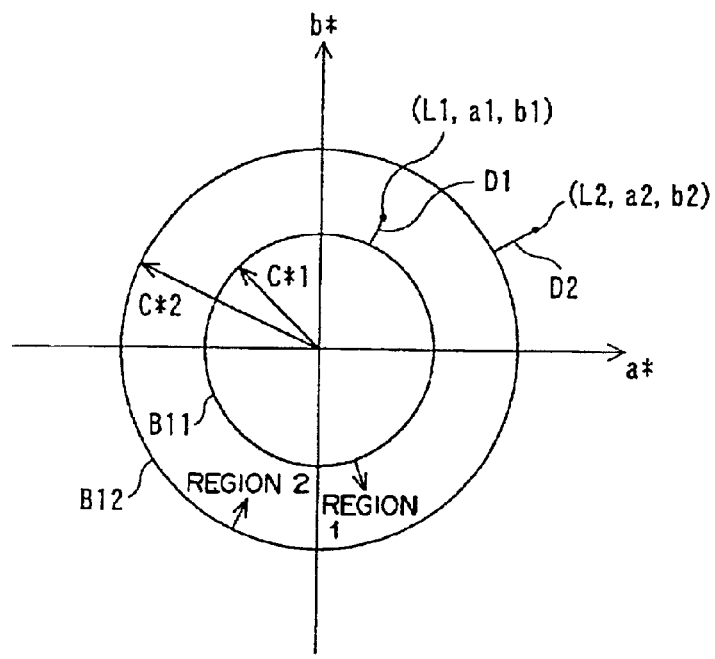
Figure 16:
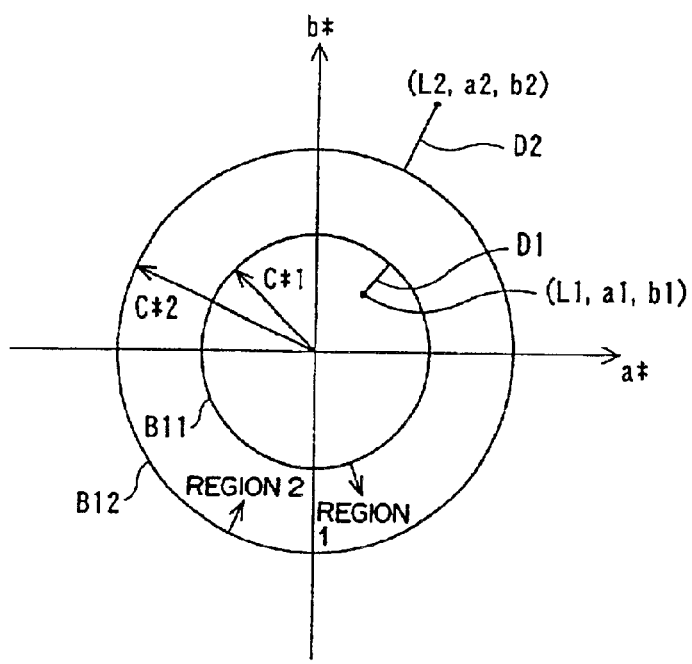

In the above embodiment, three regions 1 to 3 obtained by dividing the whole L*a*b* space according to hue angle are beforehand defined. A first modification of this embodiment will be described by way of example where the whole L*a*b* space is divided into two regions 1 and 2 according to chroma, with reference to FIGS. 13 through 16. FIG. 13 is a diagram for illustrating an example of region division according to chroma. FIGS. 14 through 16 are diagrams for illustrating practical examples of an interpolating process according to the first modification of the embodiment.

According to the first modification, two regions 1 and 2 obtained by dividing the whole L*a*b* space are beforehand defined and set (dividing step). As shown in, for example, FIG. 13, the L*a*b* space is divided by boundaries (practically, boundary surfaces in parallel to the L* axis) B11 and B12 according to chroma C* $[=(a^{*2}+b^{*2})^{1/2}]$ to obtain the two regions 1 and 2.

As shown in FIG. 13, the region 1 is a region whose chroma C* is not less than a predetermined value C*1 (for example, 10.0) in the L*a*b* space. The region 2 is a region whose chroma C* is less than a predetermined value C*2 (for example, 20.0) in the L*a*b* space. Therefore, a region having a width C*2−C*1 (10.0) overlapping on each other is added to and formed in the regions 1 and 2 shown in FIG. 13.

Even when the regions 1 and 2 obtained by dividing the whole L*a*b* space according to chroma C* is used, the color transformation table 22 for the image scanner 60 is created basically in the similar procedures (steps S11 to S25 in FIG. 5) to the above by the color transformation table creating apparatus 1 described above with reference to FIGS. 1 through 12.

Hereinafter, procedures for creating the color transformation table 22 will be described briefly.

[4-1-1] Description of Procedures for Spectral Characteristics Estimation

The spectral characteristics estimation unit 11 (step S16) estimates the spectral characteristics on the basis of several tens of color signals and several tens of kinds of spectral reflectance in the similar procedures to the above in [2-2] [refer to the Expression (10)].

[4-1-2] Description of Procedures for Spectral Reflectance Classification

The spectral reflectance classification unit 12 (step S18) in the first modification which divides the space into regions as shown in FIG. 13 determines which region 1 or 2 shown in FIG. 13 L*a*b* values of each color patch belong to, and classifies spectral reflectance of each color patch into either one of two groups 1 and 2 according to its region.

Namely, spectral reflectance whose L*a*b* values are determined to belong to the region 1 ($C^* \geq C^*1$) is classified into the group 1. Spectral reflectance whose L*a*b* values belong to the region 2 ($C^* < C^*2$) is classified into the group 2.

[4-1-3] Description of Procedures for Color Transformation Formula Creation and Procedures for Relationship Creation The relationship creation unit 141 (step S21) calculates L*a*b* values corresponding to grid-like RGB values in the almost similar procedures to the above in [2-4].

In the first modification, the relationship 1 of the whole space is calculated on the basis of grid-like RGB values, spectral characteristics of the image scanner 60 and principal component vectors calculated from spectral reflectance of the group 1. Similarly, the relationship 2 of the whole space is calculated on the basis of grid-like RGB values, spectral characteristics of the image scanner 60 and principal component vectors calculated from spectral reflectance of the group 2.

Whereby, two sets of L*a*b* values (L*a*b:1, L*a*b*2) are calculated as a result of color transformation of one set of grid-like RGB values using two color transformation formulas.

Figure 7:
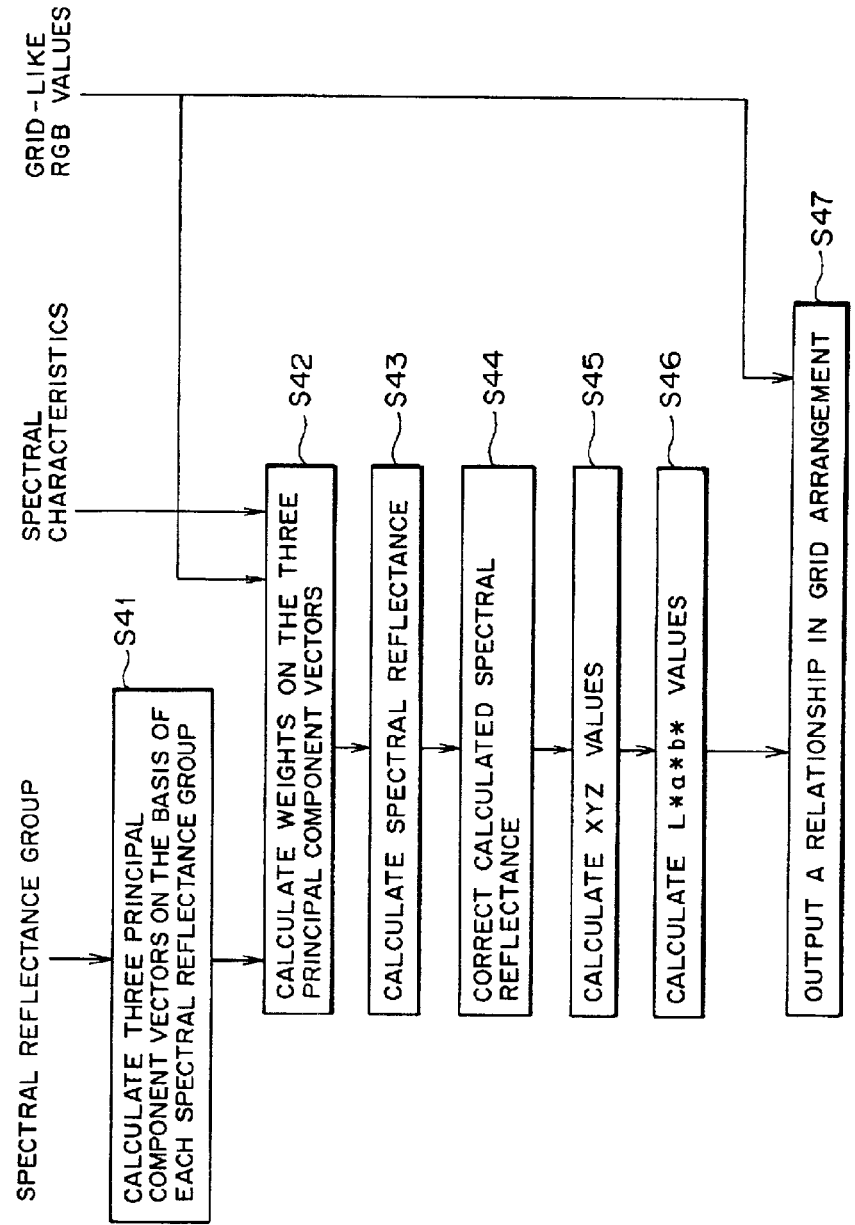
FIG. 7 is a flowchart for illustrating procedures for creating a color transformation formula and procedures for creating a relationship according to the embodiment.

Procedures for calculating a relationship of one group (spectral reflectance group) is as described above with reference to the flowchart (steps S41 to S47) shown in FIG. 7, detailed descriptions of which are thus omitted.

[4-1-4] Description of Procedures for Determination and Procedures for a Creating Process The creating process unit 143 (step S24), for example, selects either one having higher reliability between two sets of L*a*b* values created with respect to one set of RGB values by the relationship creation unit 141 to determine one set of L*a*b* values.

Prior to the selecting process, the determination unit 142 (step S23) determines whether a result of color transformation (L*a*b* values) of the RGB signal obtained by the relationship creation unit 141 belongs to a region corresponding to its color transformation formula, in the first modification. When the result belongs to the corresponding region, it is determined that the result of color transformation is correct.

Assuming here that a result of color transformation of the relationship 1 is L*a*b*1 (L1, a1, b1), a distance between L*a*b*1 (L1, a1, b1) and the boundary surface B11 of the region 1 is D1, and, similarly, a result of color transformation of the relationship 2 is L*a*b*2 (L2, a2, b2) and a distance between L*a*b*2 (L2, a2, b2) and the boundary surface B12 of the region 2 is D2, as shown in FIGS. 14 through 16, for example.

The creation process unit 143 selects and determines one result of color transformation on the basis of a result of determination by the determination unit 142 and the distances D1 and D2, in the following manner.

When two results of color transformation L*a*b*1 (L1, a1, b1) and L*a*b*2 (L2, a2, b2) belong to the regions 1 and 2, respectively, and the two results are determined to be correct, it is determined that one at a larger distance between the distances D1 and D2 from the respective boundaries B11 and B12 has higher reliability. Namely, the process is performed according to two cases below.

① In the case where D1>D2: Color transformation result L*a*b*1 (L1, a1, b1) is selected.

② In the case where D1<D2: Color transformation result L*a*b*2 (L2, a2, b2) is selected.

The example shown in FIG. 14 corresponds to the above case ② since D2>D1 although two results of color transformation L*a*b*1 (L1, a1, b1) and L*a*b*2 (L2, a2, b2) belong to the corresponding regions 1 and 2, respectively, so that the color transformation result L*a*b*2 (L2, a2, b2) is selected.

When D1=D2, an interpolation equation as shown by Expression (18) above, for example, is employed, and an average value of the two color transformation results L*a*b*1 (L1, a1, b1) and L*a*b*2 (L2, a2, b2) is calculated. The average value is then selected as a final color transformation result.

When either one of the color transformation results L*a*b*1 (L1, a1, b1) and L*a*b*2 (L2, a2, b2) is determined to be correct, the color transformation result determined to be correct is selected as it is as a final color transformation result.

In the example shown in FIG. 15, the color transformation result L*a*b*1 (L1, a1, b1) is selected since only the color transformation result L*a*b*1 (L1, a1, b1) belongs to the corresponding region 1.

When both of the two color transformation results L*a*b*1 (L1, a1, b1) and L*a*b*2 (L2, a2, b2) do not belong to the corresponding regions 1 and 2, and both of the two are determined to be incorrect, it is determined that one at a smaller distance between the distances D1 and D2 from respective boundaries B11, B12 has higher reliability. Namely, the process is performed according to two cases below.

① In the case where D1<D2 (that is, when 1/D1>1/D2): color transformation result L*a*b*1 (L1, a1, b1) is selected.

② In the case where D1>D2 (that is, when 1/D1<1/D2): color transformation result L*a*b*2 (L2, a2, b2) is selected.

The example shown in FIG. 16 corresponds to the above case ① since D1<D2 although both of the two color transformation results L*a*b*1 (L1, a1, b1) and L*a*b*2 (L2, a2, b2) do not belong to the respective corresponding regions 1 and 2, thus the color transformation result L*a*b*1 (L1, a1, b1) is selected.

When D1=D2 (1/D1=1/D2), an average value of the two color transformation results L*a*b*1 (L1, a1, b1) and L*a*b*2 (L2, a2, b2) is calculated, for example, and the average value is selected as it is as a final color transformation result.

L*a*b* values selected as above are outputted as a final color transformation result with respect to a certain set of RGB values to the memory 20, and a relationship with respect to the RGB values is determined.

The above process is performed on all grid-like RGB values (grid point signal values), whereby the color transformation table 22 for the image scanner 60 is created in the memory 20.

[4-1-5] Description of Functions and Effects of the First Modification

The above first modification provides functions and effects similar to those provided by the embodiment described above. Additionally, use of the regions 1 and 2 obtained by dividing the whole L*a*b* space according to chroma makes accurate calculation of relationships possible, according to the first modification. Namely, when principal component vectors are calculated on the basis of a spectral reflectance group obtained by classifying spectral reflectance of a color chart into chroma regions, a rate of contribution of the principal component vectors to the spectral reflectance group belonging to the corresponding chroma region 1 or 2 is high, as a matter of course. Therefore, such principal component vectors can express a spectral reflectance group belonging to the corresponding chorma region 1 or 2 more accurately, so that relationships can be calculated more accurately, as a result. Such effect is remarkable when a color patch including colors having various kinds of chroma.

[4-2] Description of a Second Modification

Figure 17:
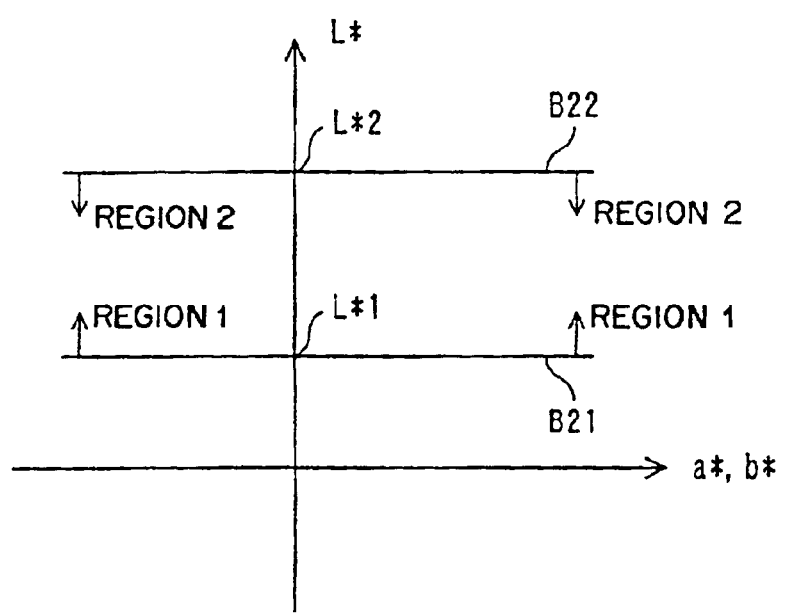
FIG. 17 is a diagram for illustrating an example of region division according to lightness according to a second modification of the embodiment.
Figure 18:
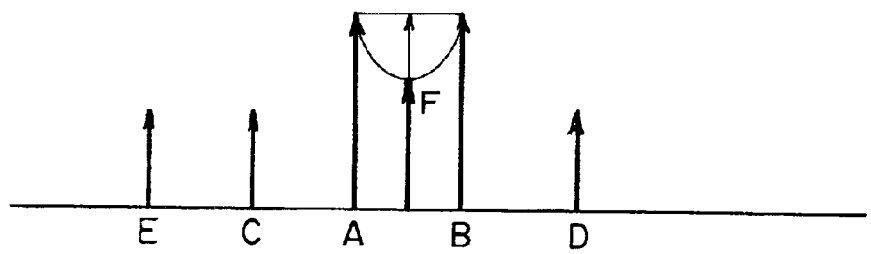
FIG. 18 is a diagram showing a simplified example of scalloping.

In the embodiment and the first modification described above, the regions 1 to 3 obtained by dividing the whole L*a*b* space according to hue angle or chroma are beforehand defined. In a second modification, description will be made by way of an example where the whole L*a*b* space is divided into two regions 1 and 2 according to lightness, with reference to FIG. 17. FIG. 17 is a diagram for illustrating an example of region division according to lightness in the second modification of this embodiment.

In the second modification, two regions 1 and 2 obtained by dividing the whole L*a*b* space are beforehand defined and set, similarly to the first modification (dividing step). These two regions 1 and 2 are obtained by dividing the L*a*b* space by boundaries (practically boundary surfaces in parallel to the a*b* plane) B21 and B22 according to lightness, as shown in FIG. 17, for example.

As shown in FIG. 17, the region 1 is a region whose lightness L* is not less than a predetermined value L*1 in the L*a*b* space. The region 2 is a region whose lightness L* is less than a predetermined value L*2 in the L*a*b* space. Therefore, a region having a width of L*2–L*1 overlapped on each other is added to and formed in the regions 1 and 2 shown in FIG. 17.

When the regions 1 and 2 obtained by dividing the whole L*a*b* space according to lightness are used, the color transformation table creating apparatus 1 described above with reference to FIGS. 1 through 12 creates the color transformation table 22 for the image scanner 60 according to basically the similar procedures to those described above (steps S11 to S25 in FIG. 5). That the number of the regions is two is the same as the first modification described above. In the second modification, the color transformation table 22 is created in the almost similar procedures to those in the embodiment and first modification described above.

The second modification provides similar functions and effects to the above-described embodiment. Additionally, use of the regions 1 and 2 obtained by dividing the whole L*a*b* space according to lightness makes accurate calculation of relationships possible according to the second modification. Namely, when principal component vectors are calculated on the basis of a spectral reflectance group obtained by classifying a color chart into lightness regions, a rate of contribution of the principal component vectors to a spectral reflectance group belong to the corresponding lightness region 1 or 2 is high, as a matter of course. Therefore, such the principal component vectors can express a spectral reflectance group belonging to a corresponding lightness region 1 or 2 more accurately, so that a relationship is accurately calculated, as a result. Such effect is remarkable when a color chart including colors having various kinds of lightness is used.

[4-3] Description of a Third Modification

In the above embodiment, the color transformation table 22 is created as one correlating an RGB signal with L*a*b* values. In a third modification, a color transformation table is created, which correlates an RGB signal with spectral reflectance (spectral reflectance corresponding to L*a*b* values as a color transformation result) calculated using the above Expression (15).

When a color transformation table correlating an RGB signal with spectral reflectance is created, the color transformation table creating apparatus 1 described above with reference to FIGS. 1 through 12 creates the color transformation table for the image scanner 60 according to basically the similar procedures to the above (steps S11 to S25 in FIG. 5).

Note that color transformation formulas used in the relationship creation unit 141 (step S21) are the above Expressions (14) and (15). Since the determination unit 142 (step S23) requires L*a*b* values corresponding to RGB values in order to determine correctness of spectral reflectance, the relationship creation unit 141 or the determination unit 142 calculates L*a*b* values corresponding to RGB values as a color transformation result in the third modification, similarly to the above-described embodiment.

When the creation process unit 143 (step S24) performs the interpolating operation process (interpolating process), Expressions (21) to (24) below are used instead of the above Expressions (17) to (20).

Assuming here that three kinds of spectral reflectance REF1 (REF1$_{380}$, REF1$_{390}$, ..., REF1$_{730}$), REF2 (REF2$_{380}$, REF2$_{390}$, ..., REF2$_{730}$), and REF3 (REF3$_{380}$, REF3$_{390}$, ..., REF3$_{730}$) are obtained as three relationships 1 to 3 with respect to one set of RGB values. L*a*b* values (color transformation results) corresponding to these kinds of spectral reflectance are assumed to be L*a*b*1 (L1, a1, b1), L*a*b*2 (L2, a2, b2) and L*a*b*3 (L3, a3, b3).

Similarly to the examples shown in FIGS. 9 through 12, a distance between L*a*b*1 (L1, a1, b1) and the boundary surface B1 of the region 1 is D1, a distance between L*a*b*2 (L2, a2, b2) and the boundary surface B2 of the region 2 is D2, and a distance between L*a*b*3 (L3, a3, b3) and the boundary surface B3 of the region 3 is D3.

When L*a*b*1 (L1, a1, b1), L*a*b*2 (L2, a2, b2) and L*a*b*3 (L3, a3, b3) belong to the respective regions 1 to 3, as shown in, for example, FIG. 9, and L*a*b*1 (L1, a1, b1), L*a*b*2 (L2, a2, b2) and L*a*b*3 (L3, a3, b3) are determined to be correct, one kind of spectral reflectance REF4 (REF4$_{380}$, REF4$_{390}$, ..., REF4$_{730}$) is calculated and determined on the basis of the distances D1 to D3 by using an interpolation formula as shown by Expression (21) below.

$$REF4_j = (REF1_j * D1 + REF2_j * D2 + REF3_j * D3)/(D1+D2+D3) \quad (21)$$

(where j=380, 390, ..., 730.)

When L*a*b*1 (L1, a1, b1) and L*a*b*2 (L2, a2, b2) belong to the corresponding regions 1 and 2, respectively, as shown in, for example, FIG. 10, and L*a*b*1 (L1, a1, b1) and L*a*b*2 (L2, a2, b2) are determined to be correct, one kind of spectral reflectance REF4(REF4$_{380}$, REF4$_{390}$, ..., REF4$_{730}$) is calculated and determined on the basis of the distances D1 and D2 by using an interpolation formula as shown by Expression (22) below.

$$REF4_j = (REF1_j * D1 + REF2_j * D2)/(D1+D2) \quad (22)$$

(where j=380, 390, ..., 730.)

When only L*a*b*1 (L1, a1, b1) belongs to the corresponding region 1 as shown in, for example, FIG. 11, and only L*a*b*1 (L1, a1, b1) is determined to be correct, REF1(REF1$_{380}$, REF1$_{390}$, ..., REF1$_{730}$) is determined as it is as REF4(REF4$_{380}$, REF4$_{390}$, ..., REF4$_{730}$) as shown by Expression (23) below.

$$REF4_j = REF1_j \qquad (23)$$

(where j=380, 390, ..., 730)

When none of L*a*b*1 (L1, a1, b1), L*a*b*2 (L2, a2, b2) and L*a*b*3 (L3, a3, b3) belong to the corresponding regions 1 to 3, respectively, and all of L*a*b*1 (L1, a1, b1), L*a*b*2 (L2, a2, a3) and L*a*b*3 (L3, a3, b3) are determined to be incorrect, one kind of spectral reflectance REF4(REF4$_{380}$, REF4$_{390}$, ..., REF4$_{730}$) is calculated and determined on the basis of reciprocals of the distances D1 to D3 by using an interpolation formula as shown Expression (24) below.

$$REF4_j = (REF1_j*(1/D1) + REF2_j*(1/D2) + REF3_j*(1/D3))/((1/D1) + (1/D2) + (1/D3)) \qquad (24)$$

(where j=380, 390, ..., 730.)

Spectral reflectance REF4(REF4$_{380}$, REF4$_{390}$, ..., REF4$_{730}$) obtained in the above interpolating process is outputted as final spectral reflectance with respect to one set of RGB values to the memory 20, and a relationship with respect to the RGB values is determined.

The above process is performed on all grid-like RGB values (grid point signal values), whereby a color transformation table correlating RGB values with spectral reflectance is created in the memory 20.

When there are a plurality of color transformation results (L*a*b* values) determined to be correct, one kind of spectral reflectance REF4 (REF4$_{380}$, REF4$_{390}$, ..., REF4$_{730}$) is calculated and determined on the basis of the distances D1 to D3 as shown by Expression (21) or (22), here. Alternatively, it is possible to determine that a color transformation result at the largest distance (color transformation result farthest away from the boundary) has the highest reliability, and select and determine it as the spectral reflectance REF4 (REF4$_{380}$, REF4$_{390}$, ..., REF4$_{730}$).

In the example shown in FIG. 9, REF1 (REF1$_{380}$, REF1$_{390}$, ..., REF1$_{730}$) is selected and determined as final spectral reflectance REF4 (REF4$_{380}$, REF4$_{390}$, ..., REF4$_{730}$) since D1>D3>D2 in the above selecting process. In the example shown in FIG. 10, REF1 (REF1$_{380}$, REF1$_{390}$, ..., REF1$_{730}$) is selected and determined as final spectral reflectance REF4 (REF4$_{380}$, REF4$_{390}$, ..., REF4$_{730}$) since D1>D2.

Similarly, when there is no color transformation result determined to be correct, one kind of spectral reflectance REF4 (REF4$_{380}$, REF4$_{390}$, ..., REF4$_{730}$) is calculated and determined on the basis of reciprocals of the distances D1 to D3 as shown by Expression (20). Alternatively, it is possible to determine a color transformation result having the largest reciprocal of the distance (that is, a color transformation result at the shortest distance from and closest to the boundary) to be one having the highest reliability, and select and determine it as the spectral reflectance REF4 (REF4$_{380}$, REF4$_{390}$, ..., REF4$_{730}$).

In the example shown in FIG. 12, REF3 (REF3$_{380}$, REF3$_{390}$, ..., REF3$_{730}$) is selected and determined as final spectral reflectance REF4 (REF4$_{380}$, REF4$_{390}$, ..., REF4$_{730}$) in the above selecting process since D3<D1<D2.

The third modification provides the similar functions and effects to the above-described embodiment, as above. Additionally, according to the third modification, a color transformation table correlating RGB signals with spectral reflectance REF4 (REF4$_{380}$, REF4$_{390}$, ..., REF4$_{730}$) as a color transformation result is created, so that the color transformation result is obtained as spectral reflectance. It is therefore possible to substitute the image scanner 60 for a simplified calorimeter.

When there are a plurality of color transformation results (L*a*b* values) determined to be correct with respect to one set of RGB values (grid point signal values), spectral reflectance REF4 (REF4$_{380}$, REF4$_{390}$, ..., REF4$_{730}$) of the RGB signal is calculated on the basis of the distances D1 to D3 between the two or three color transformation results determined to be correct and boundaries (boundary surfaces) of regions to which the respective color transformation results belong, whereby gradation of the spectral reflectance is assured.

When there are a plurality of color transformation results (L*a*b* values) with respect to one set of RGB values (grid point signal values) determined to be correct, one of plural kinds of spectral reflectance according to the plural color transformation results determined to be correct is selected as the spectral reflectance REF4 (REF4$_{380}$, REF4$_{390}$, ..., REF4$_{730}$) on the basis of the distances D1 to D3 between the plural color transformation results determined to be correct and boundaries (boundary surfaces) of regions to which the respective color transformation results belong, whereby a processing time required for relationship creation is shortened.

When there is no color transformation result (L*a*b* values) with respect to one set of RGB signals (grid point signal values) determined to be correct, spectral reflectance REF4 (REF4$_{380}$, REF4$_{390}$, ..., REF4$_{730}$) of the RGB signal is calculated on the basis of reciprocals of the distances D1 to D3 between a plurality of color transformation results obtained with respect to the RGB signal and boundaries (boundary surfaces) of regions to which the respective color transformation results belong. Even if all the color transformation results are incorrect, it is possible to calculate the spectral reflectance REF4 (REF4$_{380}$, REF4$_{390}$, ..., REF4$_{730}$) having higher reliability.

When there is no color transformation result (L*a*b* values) with respect to one RGB signal (grid point signal values) determined to be correct, one of plural kinds of spectral reflectance corresponding to the plural color transformation results is selected as the spectral reflectance REF4 (REF4$_{380}$, REF4$_{390}$, ..., REF4$_{730}$) with respect to the color signal on the basis of reciprocals of the distances D1 to D3 between the plural color transformation result obtained with respect to the color signal and boundaries (boundary surfaces) of regions to which the respective color transformation results belong. Even if all the color transformation results are incorrect, it is possible to obtain the spectral reflectance REF4 (REF4$_{380}$, REF4$_{390}$, ..., REF4$_{730}$) having higher reliability within a short time.

[4-4] Description of a Fourth Modification

In the embodiment and the first to third modifications described above, color transformation results (L*a*b* values) and distances from boundaries of regions are used when the creation process unit 143 performs the interpolating process or the selecting process on the color transformation results or spectral reflectance. Instead of the distance, a value of ΔE94 obtained by transforming the distance may be used.

In such case, a color transformation table that attains more accurate color transformation when viewed from man can be created. ΔE04 has a closer color difference when viewed by man than a distance (ΔEab) in the L*a*b* space. For this, a color transformation result using ΔE94 is more accurate when viewed by man.

[4-5] Others

The present invention is not limited to the above examples, but may be modified in various ways without departing from the scope of the invention.

In the above-described embodiment, the transformation source color space is the RGB space and the transformation target color space is the L*a*b* space, for example. However, the present invention is not limited to this. The present invention may be applied when a color transformation table correlating color signals in various color spaces with each other is created. In such case, the present invention can provide the similar functions and effects to the above-described embodiment.

In the above embodiment, the transformation target color space is divided into three or two. However, the present invention is not limited to this. It is possible to divide the color space into four or more regions. The above embodiment has been described by way of example where the transformation target color space is divided according to only hue angle, only chroma and only lightness. However, it is alternatively possible to combine at least two parameters among hue angle, chroma and lightness, and divide the transformation target color space into a plurality of regions according to these parameters.

The above embodiment has been described by way of example where principal component vectors, spectral characteristics or spectral reflectance are 36 discrete data obtained correspondingly to wavelengths (380, 390, . . . , 730 nm) for every 10 nm in the visible radiation wavelength range 380–730 nm. The present invention does not limit principal component vectors, spectral characteristics and spectral reflectance to discrete data, as above.

In the above embodiment, the determination unit 142 determines using L*a*b* values calculated by the relationship creation unit 141. Alternatively, the determination unit 142 may calculate L*a*b* values.

What is claimed is:

1. A method for creating a color transformation table correlating a color signal outputted from a color input device in a color space of said color input device (hereinafter referred to as a transformation source color space) with a color signal in a color space (hereinafter referred to as a transformation target color space) which is different from said transformation source color space, comprising:

defining a plurality of regions obtained by dividing an entire portion of said transformation target color space; and creating a color transformation table by using a plurality of color transformation formulas corresponding to said plural regions, respectively, said plural regions being defined when being divided;

wherein creating said color transformation table includes:

creating a relationship between a color signal in said transformation source color space and a color signal in said transformation target color space by using said color transformation formula according to each region for each of said color transformation formulas;

determining that a color transformation result is correct when said color transformation result, into which one color signal in said transformation source color space is transformed through a color transformation formula when said relationship is created, belongs to a region corresponding to said color transformation formula; and creating said color transformation table based on said relationship created for each of said color transformation formulas and said color transformation result determined to be correct.

2. The color transformation table creating method according to claim 1 further comprising:

reading a plurality of color regions on a color chart by said color input device, and outputting a color signal in said transformation target color space corresponding to each of said color regions from said color input device;

measuring said plurality of color regions by a calorimeter, and outputting spectral reflectance corresponding to each of said color regions from said calorimeter;

classifying said spectral reflectance according to which region among said plural regions in said transformation target color space a color signal in said transformation target color space corresponding to said spectral reflectance belongs to; and estimating spectral characteristics of said color input device based on said color signal outputted from said color input device and said spectral reflectance outputted from said colorimeter;

wherein, when said color transformation table is created, said color transformation formula is created for each of said regions in said transformation target color space based on said spectral reflectance classified and said spectral characteristics estimated.

3. The color transformation table creating method according to claim 1, wherein said transformation target color space is a uniform color space.

4. The color transformation table creating method according to claim 1, wherein said plural regions have regions overlapping on each other.

5. The color transformation table creating method according to claim 1, wherein said transformation target color space is divided according to hue angle to provide said plural regions.

6. The color transformation table creating method according to claim 1, wherein said transformation target color space is divided according to chroma to provide said plural regions.

7. The color transformation table creating method according to claim 1, wherein said transformation target color space is divided according to lightness to provide said plural regions.

8. The color transformation table creating method according to claim 1, wherein when there are a plurality of color transformation results determined to be correct with respect to said one color signal at said determination, a color transformation result with respect to said one color signal is calculated at said creation of said color transformation table based on values relating to distances between said plural color transformation results determined to be correct and boundaries of said regions to which said plural color transformation results belong.

9. The color transformation table creating method according to claim 2, wherein when there are a plurality of color transformation results determined to be correct with respect to said one color signal at said determination, a color transformation result with respect to said one color signal is calculated at said creation of said color transformation table based on values relating to distances between said plural color transformation results determined to be correct and boundaries of said regions to which said plural color transformation results belong.

10. The color transformation table creating method according to claim 1, wherein when there are a plurality of color transformation results with respect to said one color signal determined to be correct at said determination, one of said plural color transformation results determined to be correct is selected as a color transformation result with respect to said one color signal at said creation of said color transformation table based on values relating to distances between said plural color transformation results determined to be correct and boundaries of said regions to which said plural color transformation results belong.

11. The color transformation table creating method according to claim 2, wherein when there are a plurality of color transformation results with respect to said one color signal determined to be correct at said determination, one of said plural color transformation results determined to be correct is selected as a color transformation result with respect to said one color signal at said creation of said color transformation table based on values relating to distances between said plural color transformation results determined to be correct and boundaries of said regions to which said plural color transformation results belong.

12. The color transformation table creating method according to claim 1, wherein when there is no color transformation result with respect to said one color signal determined to be correct at said determination, a color transformation result with respect to said color signal is calculated at said creation of said color transformation table based on reciprocals of values relating to distances between said plural color transformation results obtained with respect to said color signal when said relationship is created and boundaries of said regions to which said respective color transformation results belong.

13. The color transformation table creating method according to claim 2, wherein when there is no color transformation result with respect to said one color signal determined to be correct at said determination, a color transformation result with respect to said color signal is calculated at said creation of said color transformation table based on reciprocals of values relating to distances between said plural color transformation results obtained with respect to said color signal when said relationship is created and boundaries of said regions to which said respective color transformation results belong.

14. The color transformation table creating method according to claim 1, wherein there is no color transformation result with respect to said one color signal determined to be correct at said determination, one of a plurality of color transformation results is selected as a color transformation result with respect to said one color signal at said creation of said color transformation table based on reciprocals of values relating to distances between said plural color transformation results obtained with respect to said color signal when said relationship is created and boundaries of said regions to which said plural color transformation results belong.

15. The color transformation table creating method according to claim 2, wherein there is no color transformation result with respect to said one color signal determined to be correct at said determination, one of a plurality of color transformation results is selected as a color transformation result with respect to said one color signal at said creation of said color transformation table based on reciprocals of values relating to distances between said plural color transformation results obtained with respect to said color signal when said relationship is created and boundaries of said regions to which said plural color transformation results belong.

16. The color transformation table creating method according to claim 1, wherein said color transformation table correlates a color signal in said transformation source color space with spectral reflectance according to a color transformation result as a color signal in said transformation target color space.

17. The color transformation table creating method according to claim 2, wherein said color transformation table correlates a color signal in said transformation source color space with spectral reflectance according to a color transformation result as a color signal in said transformation destination color space.

18. The color transformation table creating method according to claim 16, wherein when there are a plurality of color transformation results with respect to said one color signal determined to be correct at said determination, spectral reflectance of said one color signal is calculated at said creation of said color transformation table based on values relating to distances between said plural color transformation results determined to be correct and boundaries of said regions to which said plural color transformation results belong.

19. The color transformation table creating method according to claim 17, wherein when there are a plurality of color transformation results with respect to said one color signal determined to be correct at said determination, spectral reflectance of said one color signal is calculated at said creation of said color transformation table based on values relating to distances between said plural color transformation results determined to be correct and boundaries of said regions to which said plural color transformation results belong.

20. An apparatus for creating a color transformation table correlating a color signal outputted from a color input device in a color space (hereinafter referred to as a transformation source color space) of said color input device with a color signal in a color space (hereinafter referred to as a transformation target color space) which is different from said transformation source color space, comprising:

a color transformation table creation unit for creating said color transformation table by using a plurality of color transformation formulas corresponding to a plurality of regions, respectively, said regions being obtained by dividing said transformation target color space;

said color transformation table creating unit including:

a relationship creation unit for creating a relationship between a color signal in said transformation source color space and a color signal in said transformation target color space by using said color transformation formula according to each region for each of said color transformation formulas;

a determining unit for determining that a color transformation result is correct when said color transformation result, into which one color signal in said transformation source color signal is transformed through a color transformation formula when said relationship is created by said relationship creating unit, belongs to a region corresponding to said color transformation formula; and a creation process unit for obtaining a relationship based on plural relationships created by using said plural color transformation formulas in said relationship creation unit and said color transformation result determined to be correct by said determining unit to create said color transformation table.

21. The color transformation table creating apparatus according to claim 20 further comprising:

an input unit for inputting a color signal in said transformation source color space corresponding to each of a plurality of color regions on a color chart, said color signal being obtained by reading said color regions by said color input device;

a colorimeter for measuring said plurality of color regions to obtain spectral reflectance corresponding to each of said color regions;

a classification unit for classifying said spectral reflectance according to which region among said plural regions in said transformation target color space a color signal in said transformation target color space corresponding to said spectral reflectance belongs to; and a spectral characteristics estimation unit for estimating spectral characteristics of said color input device on the basis of said color signal inputted from said input unit and said spectral reflectance obtained by said colorimeter;

wherein said color transformation table creation unit creates a color transformation formula for each of said regions in said transformation target color space on the basis of said spectral reflectance classified by said classification unit and said spectral characteristics estimated by said spectral characteristics estimation unit.

22. A computer readable record medium in which a color transformation table creating program for causing a computer to execute operations including creating a color transformation table correlating a color signal outputted from a color input device in a color space of said color input device (hereinafter referred to as a transformation source color space) with a color signal in a color space (hereinafter referred to as a transformation target color space) which is different from said transformation source color space is recorded, comprising:

creating said color transformation table by using a plurality of color transformation formulas corresponding to a plurality of regions, respectively, said regions being obtained by dividing said transformation target color space;

creating a relationship between a color signal in said transformation source color space and a color signal in said transformation target color space by using said color transformation formula according to each region for each of said color transformation formulas;

determining that a color transformation result is correct when said color transformation result, into which one color signal in said transformation source color signal is transformed through a color transformation formula when said relationship is created by said relationship creating unit, belongs to a region corresponding to said color transformation formula; and obtaining a relationship based on plural relationships created by using said plural color transformation formulas and said color transformation result determined to be correct to create said color transformation table.

23. The computer readable record medium in which a color transformation table creating program is recorded according to claim 22, wherein said color transformation table creating program makes said computer further function as:

a classification unit for classifying spectral reflectance according to which region among said plural regions in said transformation target color space a color signal in said transformation target color space corresponding to said spectral reflectance belongs to, said spectral reflectance being obtained by measuring each of a plurality of color regions on a color chart by a colorimeter; and a spectral characteristics estimation unit for estimating spectral characteristics of said color input device on the basis of a color signal in said transformation target color space obtained for each of said color regions by reading said plurality of color regions by said color input device and said spectral reflectance obtained by said colorimeter;

wherein when said color transformation table creating program makes said computer function as said color transformation table creation unit, said color transformation formula is created for each of said regions in said transformation target color space on the basis of said spectral reflectance classified by said classification unit and said spectral characteristics estimated by said spectral characteristics estimation unit.

* * * * *

UNITED STATES PATENT AND TRADEMARK OFFICE
CERTIFICATE OF CORRECTION

PATENT NO. : 6,963,426 B2  
APPLICATION NO. : 09/816110  
DATED : November 8, 2005  
INVENTOR(S) : Junichi Odagiri et al.

It is certified that error appears in the above-identified patent and that said Letters Patent is hereby corrected as shown below:

Column 38,  
Line 9, change "calorimeter," to -- colorimeter --.  
Line 11, change "calorimeter" to -- colorimeter --.

Signed and Sealed this

Twenty-seventh Day of June, 2006

JON W. DUDAS  
*Director of the United States Patent and Trademark Office*